Dec. 10, 1957  LA VERN H. BARRETT  2,815,622
PACKAGING METHODS AND APPARATUS
Filed April 21, 1953  12 Sheets-Sheet 5

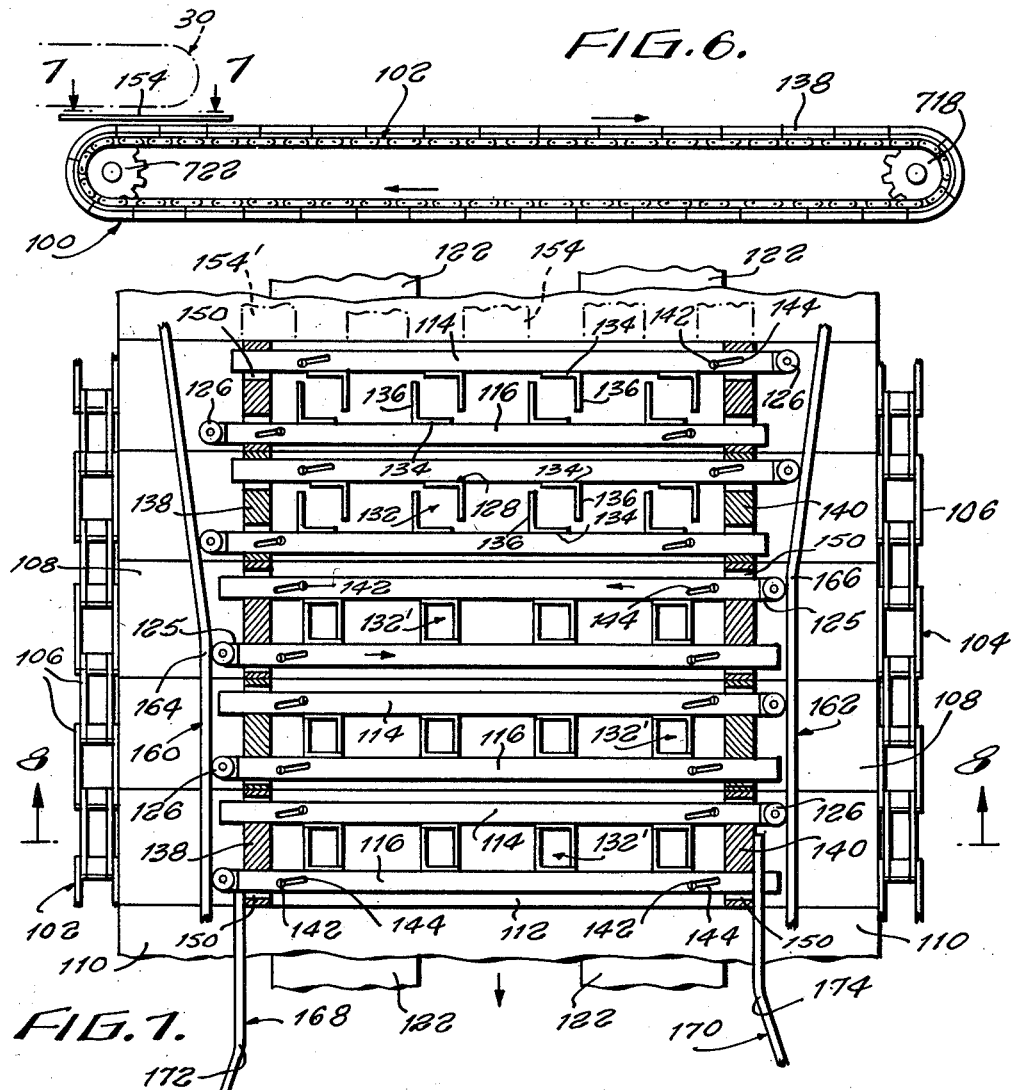
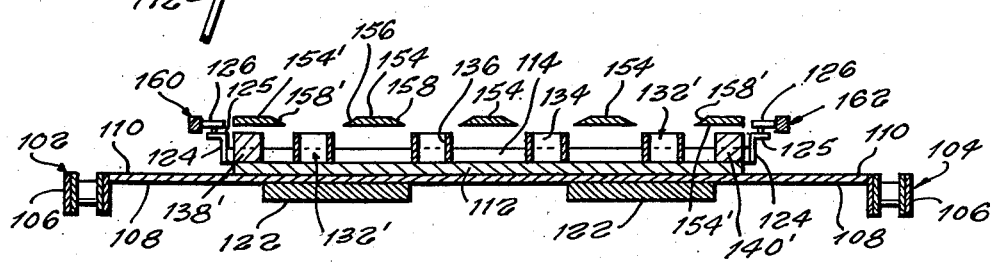

INVENTOR
LA VERN H. BARRETT
BY Edwin Levisohn &
Harry Cohen
ATTORNEYS

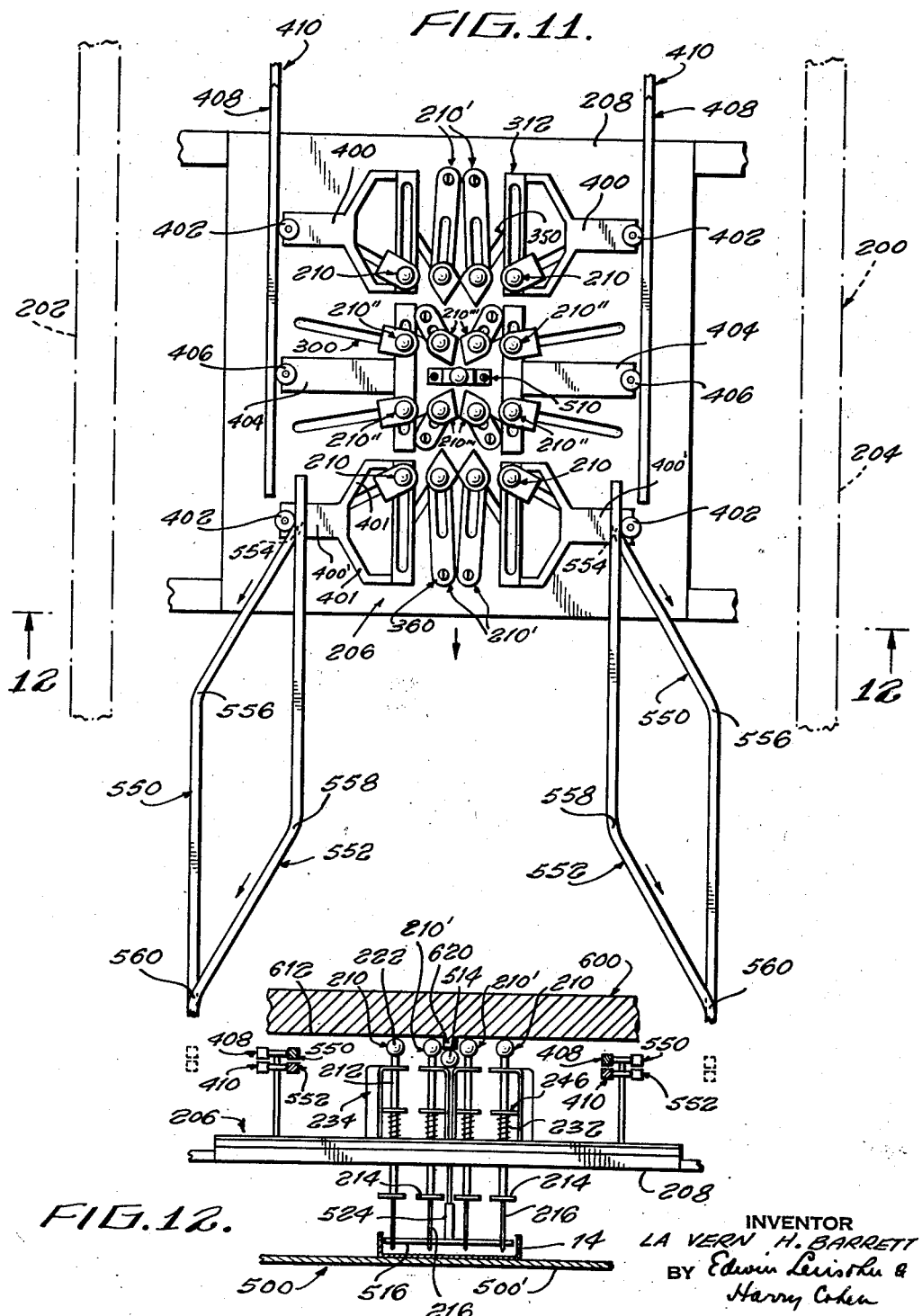

Dec. 10, 1957 LA VERN H. BARRETT 2,815,622
PACKAGING METHODS AND APPARATUS
Filed April 21, 1953 12 Sheets-Sheet 7
FIG. 13.
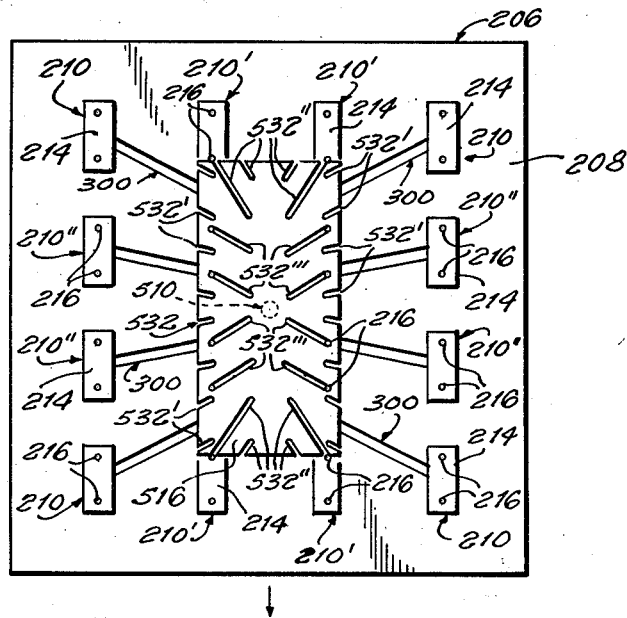
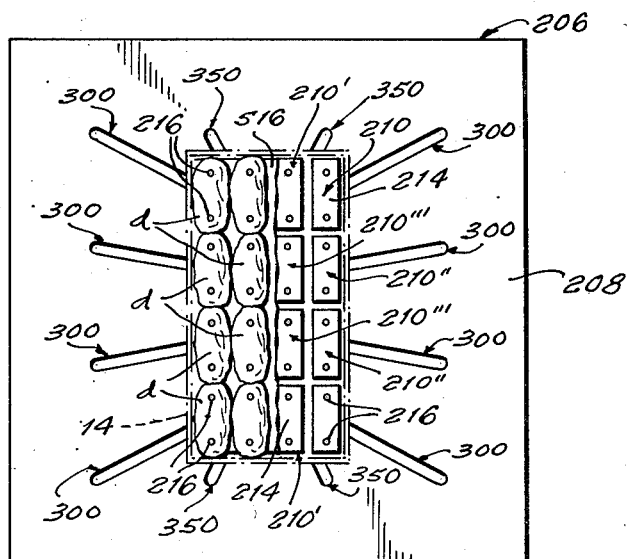
FIG. 14.
INVENTOR
LA VERN H. BARRETT
BY
ATTORNEYS Dec. 10, 1957 LA VERN H. BARRETT 2,815,622
PACKAGING METHODS AND APPARATUS
Filed April 21, 1953 12 Sheets-Sheet 8

INVENTOR
LA VERN H. BARRETT
BY
ATTORNEYS

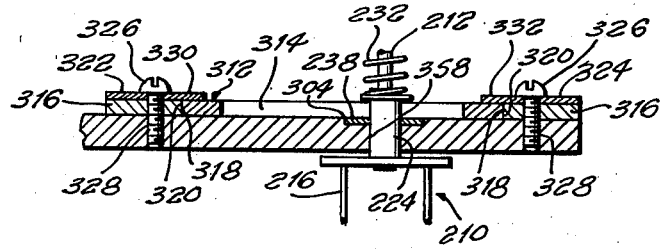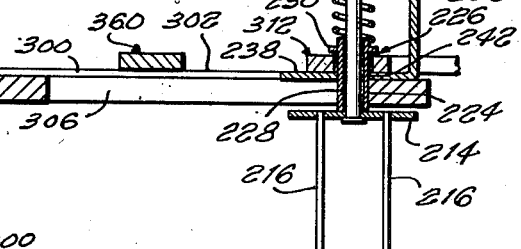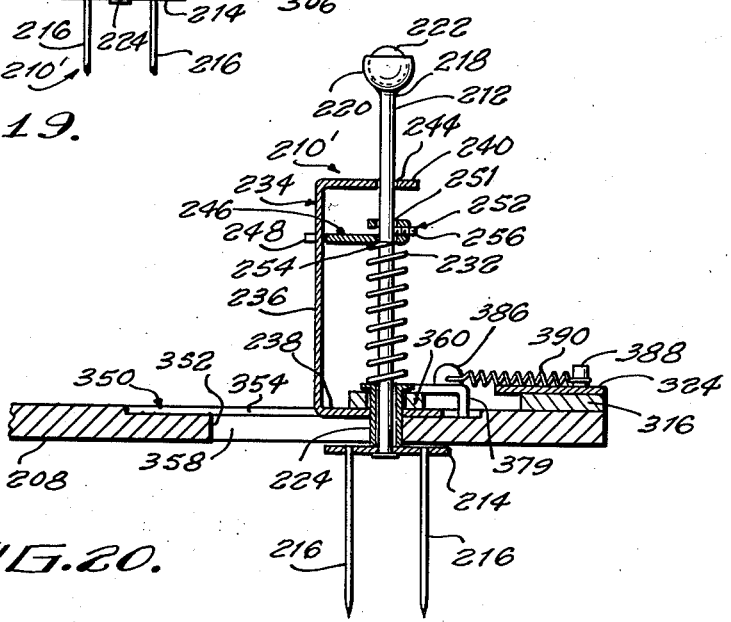

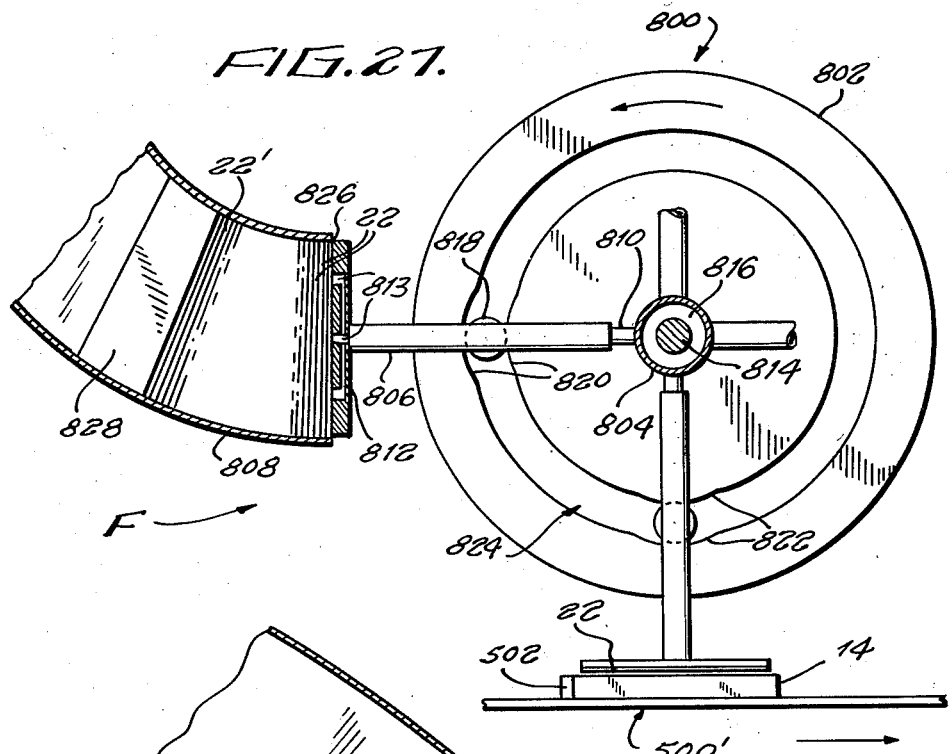
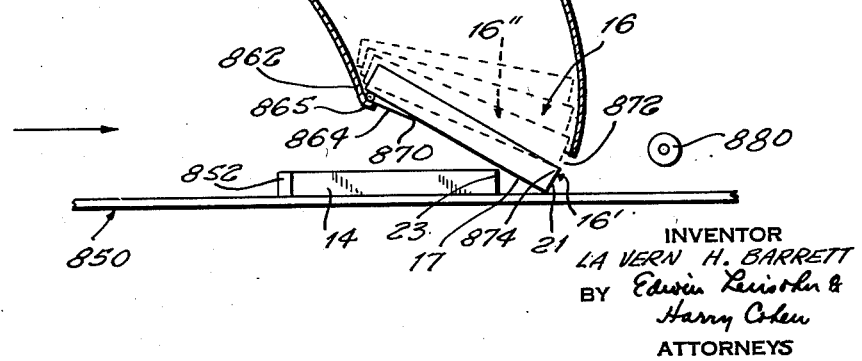

Dec. 10, 1957     LA VERN H. BARRETT     2,815,622
PACKAGING METHODS AND APPARATUS
Filed April 21, 1953                               12 Sheets-Sheet 12

INVENTOR
LA VERN H. BARRETT
BY
ATTORNEYS

United States Patent Office 2,815,622
Patented Dec. 10, 1957

2,815,622

PACKAGING METHODS AND APPARATUS

La Vern H. Barrett, Lyons, N. Y., assignor to Manett Enterprises, Inc., New York, N. Y., a corporation of New York Application April 21, 1953, Serial No. 350,168

27 Claims. (Cl. 53—24)

This invention relates generally to improvements in packaging methods and apparatus and, more particularly, to improvements in packaging methods and apparatus adapted to package a predetermined number of articles in a preselected arrangement.

Articles, such as dates and the like, have up to the present time been packaged either entirely or substantially entirely by hand operations, and accordingly such packaging has been expensive and time consuming as well as possessing the other obvious inherent disadvantages of hand packaging operations. Such hand packaging operations further require a substantial amount of manual handling of the articles to be packaged and when such articles are of the edible variety such operations are unsanitary and have the attendant disadvantage of providing a possible source of product contamination. It is accordingly the primary aim and object of the present invention to provide the first successful apparatus for automatically packaging dates and similar articles, said apparatus being simple in design and construction, reliable in operation, and which requires for its efficient performance a minimum of skill and attention on the part of the operator.

It is another object of the present invention to provide packaging apparatus of the above character which is completely automatic in operation and which is adapted to package articles by a series of successive steps commencing with the feeding of the articles to be packaged at a feeding station.

It is another object of the present invention to provide automatic packaging apparatus of the above character which substantially reduces the packaging time and expense of the presently, and heretofore, used hand packing operations whereby article packaging by the instant apparatus is relatively economical and fast consistent with efficiency and a uniform packaged product that is untouched by human hands in the packaging operations.

It is another important object of the present invention to provide, in apparatus of the above character, a series of successive inter-dependent stations which are adapted to process and arrange articles fed promiscuously to a hopper corresponding to the package receptacle and to deposit such arranged articles in such receptacle in a preselected manner.

It is yet another object of the present invention to provide an improved method of packing a predetermined number of articles in a preselected arrangement in a receptacle, said method being simple and unique in character and eminently suitable for the packaging of dates and similar articles.

The above and other objects, features and advantages of the present invention will be more fully understood from the following description considered in connection with the accompanying illustrative drawings.

In the drawings which illustrate the best mode now contemplated by me for carrying out my invention:

Fig. 6 is a side elevational view of the article forming and positioning apparatus;

Fig. 7 is a sectional view taken on the line 7—7 of Fig. 6;

Fig. 8 is a sectional view taken on the line 8—8 of Fig. 7;

Fig. 11 is a view similar to Fig. 9 with the control head shown in a further advanced position and with the pick-up heads shown in the grouped position;

Fig. 12 is a sectional view taken on the line 12—12 of Fig. 11;

Fig. 13 is a bottom plan view of the control head with the pick-up heads thereof being shown in the degrouped position;

Fig. 14 is a view similar to Fig. 13 with the pick-up heads being shown in the grouped position and with parts broken away to reveal structural details;

Fig. 17 is a sectional view taken on the line 17—17 of Fig. 15;

Fig. 18 is a sectional view taken on the line 18—18 of Fig. 15;

Fig. 19 is a sectional view taken on the line 19—19 of Fig. 15;

Fig. 20 is a sectional view taken on the line 20—20 of Fig. 15;

Fig. 27 is a fragmentary side elevational view of the divider sheet feed apparatus with parts being shown in section and broken away to reveal structural details;

Fig. 28 is a fragmentary sectional view of the package cover feeding apparatus;

Fig. 29 is a perspective view of the completed package processed by the apparatus of the present invention;

Fig. 30 is a top plan view of the package with the cover part thereof removed;

Fig. 31 is a longitudinal sectional view of the package;

Fig. 32 is a view similar to Fig. 31 showing a modified form of package; and

Figure 1:
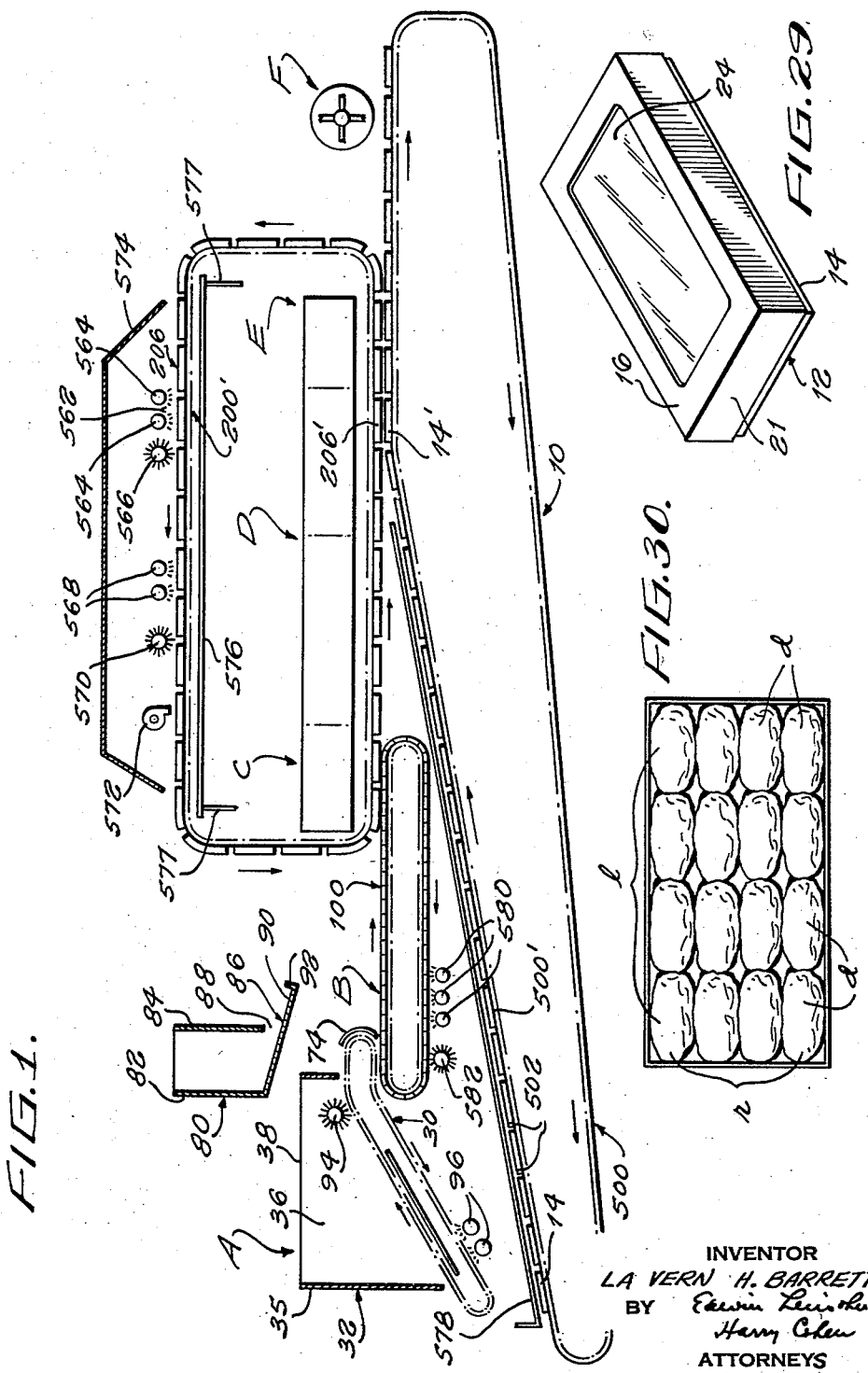
Fig. 1 is a schematic view of the article packaging apparatus formed according to the present invention.

With reference to the drawings, and more particularly to Fig. 1 thereof, there is shown a schematic representation of the article packaging apparatus 10 formed according to the present invention, said apparatus comprising a feeding station A (Figs. 1 and 3–5), a forming and positioning station B (Figs. 1 and 6–8), a pick-up station C (Figs. 1, 9, 10, 21–26), a grouping and boxing station D (Figs. 1 and 11–26), pressing and degrouping stations E (Figs. 1 and 11–26), and divider sheet and package cover feed stations F (Figs. 1, 27 and 28). Thus the packaging apparatus 10 comprises a plurality of interdependent and related stations to which the articles to be packaged are successively fed and each of the stations, briefly referred to above, will be described in detail hereinafter. With reference to Figs. 29–32, there is shown a package 12 comprising a receptacle part 14 and a complementary cover part 16 which in their assembled relation are adapted to contain a plurality of articles, said articles being dates $d$ in the illustrated embodiment. The package 12 is shown as of rectangular configuration although it will be apparent from the description that follows that said package may be of any desired size and configuration and may contain a plurality of articles in any preselected arrangement. In the illustrated embodiment the package 12 contains two layers of dates $d$, 18 and 20, which are separated by a divider sheet 22, each of said layers consisting of a total of sixteen dates which are arranged in four longitudinally and laterally aligned rows. Thus each laterally aligned row $r$ of dates $d$ consists of four dates which are disposed in parallel disposition as clearly shown in Fig. 30. Each of the rows $r$ of dates are aligned with adjacent rows whereby the dates $d$ are aligned in longitudinal rows 1. Thus the dates $d$ are, in the illustrated embodiment, aligned in lateral rows $r$ and longitudinal rows 1, each row 1, consisting of four daes disposed in end-to-end relation. As will be apparent from the description which follows, the particular packaging arrangement and the particular articles to be packaged are given by way of example only and that articles other than dates $d$ may be packaged by the instant apparatus and such articles may be arranged in a package otherwise than as shown and described above. The receptacle part 14 and the cover part 16 of package 12 are dimensioned complementary to each other so as to interfit in the manner shown in Fig. 29. The cover part 16 of the package 12 is preferably provided with a transparent panel 24 of plastic or other suitable material so that the contents of said package may be readily visible. The dates $d$ are automatically packaged so as to form a completed package 12 by the apparatus 10 in a manner to be described in detail hereinafter.

*Feeding station*

With reference to Figs. 1 and 3 through 5, the feeding station A comprises an endless conveyor 30 having associated therewith a hopper 32 into which the dates $d$ to be packaged are loosely or promiscuously fed. The hopper 32 is in the form of an open bottom receptacle and comprises a pair of laterally spaced side walls 34 and 36 which terminate at the bottoms thereof in inwardly inclined portions 34' and 36', said receptacle having end walls 35 and 37 secured to said side walls in any desired manner. The hopper 32 is adapted to deposit dates $d$ onto the upper run 30' of conveyor 30 in a prearranged manner as said conveyor advances relative to said hopper. Thus the dates $d$ are fed loosely or promiscuously to the hopper 32 through the open top 38 thereof and the bottom 40 of said hopper is open and is associated with the upper run 30' of the conveyor 30 in the manner now to be described. The endless conveyor 30 comprises a pair of laterally spaced link chains 42 and 44 which are structurally identical, each of said chains comprising a plurality of links 46 which may be interconnected in any desired manner. At the interconnection of each pair of adjacent links 46 there is provided an aperture 48 which extends transversely through said links, aligned pairs of apertures 48 being adapted to support and guide the rods 50 which project axially outwardly of the cup bars 52. Each of the cup bars 52, which are structurally identical, have defined therein a longitudinally aligned series of four cups 54 which are adapted to receive dates $d$ from the hopper 32. Each of the cup bars 52 are adapted to be joggled or axially reciprocated by means to be described hereinafter when said bars are in date receiving relation with the open bottom 40 of the hopper 32. Thus the bars 52 extend transversely of the conveyor 30 for the full length thereof in adjacent relation to each other and each of said bars is provided with a pair of axially projecting rods 50 which extend through an aligned pair of apertures 48 of the link chains 42 and 44. It will be understood that the rods 50 are dimensioned relative to the aperture 48 so as to provide for said axial reciprocatory movement. Each of the date cups 54 in bars 52 is dimensioned to approximate the size of dates $d$ with a comfortable margin of clearance so that dates $d$ may be readily received in the cups 54 from the hopper 32. Cups 54 are of arcuate configuration longitudinally and transversely so as to facilitate the deposition of dates in said cups.

Figure 4:
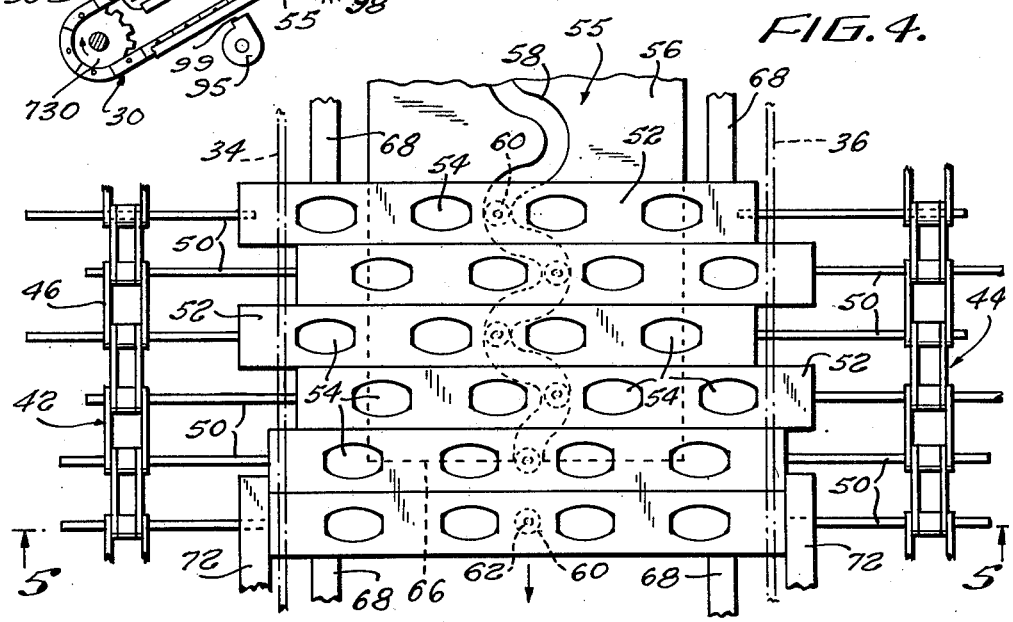
Fig. 4 is a sectional view taken on the line 4—4 of Fig. 3.
Figure 5:
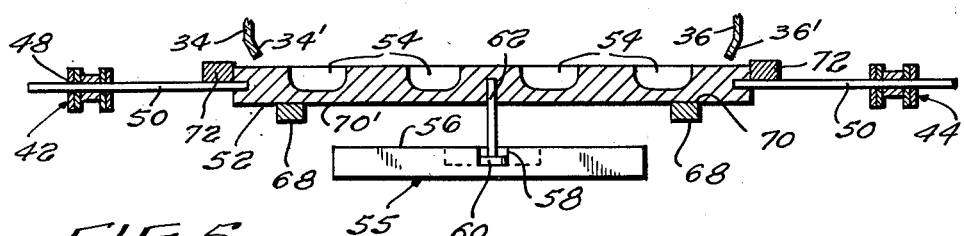
Fig. 5 is a sectional view taken on the line 5—5 of Fig. 4.

The conveyor 30, and more particularly the top run 30' thereof, is adapted to move in the direction of the arrows shown and in order to provide for the axial reciprocation or joggling movement of the bars 52 there is provided a cam plate 55 which is fixed to the apparatus 10 in any desired manner, for example said cam plate may be fixed to the hopper 32 or may be fixed to any desired stationary frame structure of the apparatus. The cam plate 55 has defined in the upper face 55 thereof a cam slot 58 which is of reversed curve formation as best shown in Fig. 4, said cam slot being dimensioned to receive the rollers 60 which depend from shafts 62 fixed to each of the bars 52 intermediate the extremities thereof. Thus each of the bars 52 has a cam roller 60 depending therefrom and adapted to ride in the slot 58, it being apparent that as the bars 52 advance in the direction of the arrows, said bars will be joggled back and forth or axially reciprocated. The fixed cam plate 55 extends for a substantial length of the open bottom 40 of hopper 32 and it will be apparent that each of the bars 52 will be joggled in the aforedescribed manner for its length of travel on the conveyor 30 corresponding to the length of said cam plate. Thus each bar 52 will commence its joggling movement substantially at point 64 at the entrance to the open bottom 40 of the hopper 32 and will terminate such movement substantially at the point 66 which is the point of longitudinal termination of the fixed cam plate 55. Each of the date receiving pockets or cups 54 is dimensioned substantially oversized relative to the usual date but is of a size and shape so as to accommodate but a single date. From the above it will be apparent that the bars 52 will be axially reciprocated or joggled in opposite directions and that adjacent bars when associated with cam plate 55 will be moved in opposite directions, this arrangement facilitating the deposition of dates in pockets 54. Each date $d$ in date receiving relation relative to the bars 52 will have a tendency to seek a date receiving pocket 54 and similarly the joggling movement or reverse axial reciprocation of the bars 52 will have a tendency to seek such dates wherefore it will be apparent that the above described arrangement will provide for the deposition of a date in each of the date receiving pockets 54 of the bars 52. The dates $d$ in the hopper 32 will be gravitationally urged towards the open bottom 40 thereof as will be readily apparent. The dates $d$ when received in the pockets 54 of the bars 52 will be advanced by the conveyor 30 to the forming and positioning station B for further processing, and eventual packaging.

In order to guide the upper run 30' of conveyor 30 for the movement thereof there is provided a pair of laterally spaced longitudinally extending support members 68 which are adapted to support and guide bars 52, it being understood that the members 68 are fixed to the frame structure of the apparatus 10 in any desired manner. In practice, the upper face 70 of the members 68 will be coated with a suitable lubricant whereby to provide for the relative movement between said members and the bars 52 of the conveyor 30. Thus the support members 68 coact with the bottom face 70' of the bars 52 so as to support the latter during the movement thereof. After the bars 52 advance past the position 66 they are adapted to be restrained against axial movement by means of the rails 72 which are laterally spaced corresponding to the length of said bars with sufficient clearance to provide for relative movement between said bars and the fixed guide rails. The guide rails 72 are fixed to the apparatus in any desired manner and it will be understood that after the bars 52 advance to said guide rails they will have cleared cam plate 55 and will be restrained against axial movement whereby the bars 52 will automatically assume a longitudinally aligned position after clearing the cam plate 55, said longitudinal alignment being essential in order to position the dates in pockets 54 for subsequent transfer to the next station. Thus after the joggling movement is imparted to the bars 54 through the cooperative association of rollers 60 and cam track 58 said bars will be advanced on the upper run 30' of conveyor 30 and will be restrained against axial reciprocatory movement. The laterally spaced guide rails 72 will extend substantially to the end of the upper run 30' of the conveyor 30 whereby to restrain the bars 52 against axial movement for substantially the full length of the upper run 30' from the time said bars are released from association with cam plate 55. As noted above each of the bars 52 is provided with a series of four aligned pockets 54, this arrangement corresponding to the arrangement of dates in each row r of package 12. Thus each bar 52 is provided with the same number of pockets 54 as there are dates in a transverse row r of one of the layers of package 12. Positioned at the end of the top run 30' of conveyor 30, in fixed relation with the apparatus 10, is an arcuate guide plate 74 which is of a contour that substantially conforms to the contour of adjacent portions of the conveyor 30. The arcuate plate 74 is in closely spaced relation with the outermost portion 76 of the conveyor 30 and said plate is adapted to prevent dates d in cups 54 from being discharged from the latter during the transferral of said dates from the conveyor 30 to the conveyor 100 of the forming and positioning station B to be described hereinafter. Thus plate 74 is operative to prevent the dates d in cups 54 from being discharged therefrom prematurely. Plate 74 is provided with depending flanges 75 spaced corresponding to the spacing of guide rails 72 and forming a continuation thereof, said flanges being effective to maintain the alignment of bars 52 until the dates are transferred to station B. It will be obvious from the above that the bars 52 will be in longitudinal alignment at the entrance 78 of plate 74 and that accordingly the cups 54 will be in longitudinal alignment relative to the upper run 30' of conveyor 30. Thus the dates d in cups 54 will be both longitudinally and laterally aligned on being discharged from the conveyor 30 and on the advancing of the latter the dates d positioned in said cups will be gravitationally discharged therefrom onto the conveyor 100 in a manner which will be apparent from the description which follows. If desired the inner face of the guide 74 may be coated with Teflon, or the like, in order to prevent the dates d from adhering or tending to adhere thereto during their advance to the conveyor 100. Thus by Teflon coating the inner face of guide 74 the dates d moving relative to said face during their transfer to the conveyor 100 will have no tendency to stick to said face of the guide.

If for any reason any of the cups 54 should pass the hopper 32 without receiving a date d, then such an unfilled cup may be manually filled by an operator from the auxiliary hopper 80 (Fig. 1). The auxiliary hopper 80 is in the form of a receptacle spaced above the hopper 32 and comprises a pair of laterally spaced side walls 82 and 84 and an inclined bottom wall 86 which is shown in the illustrated embodiment as being integral with the wall 82. An opening 88 is defined between the bottom of the wall 84 and the inclined bottom wall 86, said opening being adapted for the passage of dates therethrough so that such dates will be readily accessible at the portion 90 of the bottom wall 86, it being noted that the portion 90 terminates in an upstanding flange 92 which prevents the dates from being discharged from the bottom wall 86. In practice, the auxiliary hopper 80 will be charged with dates and the latter will be gravitationally urged towards the bottom wall 86 and, in the event that any cup 54 should emerge from the hopper 32 without a date positioned therein, such cup will be manually filled by an operator from the auxiliary hopper 80 and, more particularly, from the bottom wall portion 90 thereof.

The hopper 32 preferably has positioned therein a motor driven brush 94 which is spaced from the upper run 30' of the conveyor 30 so as to prevent any dates riding up said top run that are not positioned in a cup 54, it being understood that said brush will be effective to prevent the dates in the hopper from moving past such brush except when such dates are properly positioned in a date receiving cup 54. After the dates in cups 54 are transferred to the conveyor 100 the bars 52 will be cleaned in a manner now to be described. It will be apparent that the bottom run 30'' of the conveyor 30 will be free of dates and said bottom run will be cleaned by means of the spray tubes 96 which are adapted to discharge a jet of water onto said bottom run of the conveyor 30. Positioned below the spray tubes 96 in spray receiving relation therewith are hoods 97 which are adapted to receive the spray discharged from the bottom run 30'' of the conveyor 30. After the bottom run of the conveyor is subjected to a water spray in the aforedescribed manner said bottom run will be cleaned by means of the revolving brush 98, said brush being adapted to engage the adjacent face of the bottom run 30'' of the conveyor 30 to subject said bottom run to a thorough brush cleaning action. Following the brush cleansing of the bottom run 30'' of the conveyor 30, said bottom run will be dried by means of the blower 95 which has a discharge outlet 99 directed at the bottom face of the bottom run 30'' of the conveyor 30, wherefore it will be apparent that the upper run 30' of said conveyor will be in a clean and dried condition on entering hopper 32. Thus as the bottom run 30'' of the conveyor 30 advances it will be cleaned by means of the water sprays 96 and brush 98 and the further advance of said bottom run will result in drying the latter by means of the blower 95 as aforedescribed whereby each of the bars 52 when advanced to a date receiving position will be thoroughly cleaned and dried. The transfer of the dates in cups 54 from the conveyor 30 to the conveyor 100 will now be described.

*Forming and positioning station*

The conveyor 100 of the forming and positioning station B comprises a pair of laterally spaced endless link chains 102 and 104, each of said link chains being structurally similar to the link chains 42 and 44 of the conveyor 30. Thus each of the link chains 102 and 104 comprises a plurality of interconnected links 106, companion pairs of said links being transversely aligned and having secured therebetween a series of longitudinally extending plates 108, said plates having secured to the upper faces 110 thereof bars 112, the latter being adapted to support a companion pair of bars 114 and 116. Thus the upper face of each of the bars 112 are adapted to support an associated pair of bars 114 and 116 and said bars 112 are fixed to a plate 108, the latter being fixed to the link chains 102 and 104 of the conveyor 100. Each of the bars 114 and 116 is structurally similar and said bars are oppositely arranged to form companion pairs of bars for the reason which will be evident from the description that follows, each of said bars being mounted for both longitudinal or axial and lateral movement. It will be understood that plates 108 are disposed in adjacent relation and extend for the full length of conveyor 100, each of said plates mounting a companion pair of bars 114 and 116 which are oppositely arranged, through the intermediation of bars 112. Each of the longitudinally extending bars 114 and 116 is of uniform cross section and projecting upwardly from one end of said bars is an upstanding arm 124, said arm carrying a rod 125 having a roller 126 rotatably mounted thereon. The rollers 126 constitute cam rollers and it will be apparent that said rollers are provided with substantially vertically disposed axes of rotation. The cam rollers 126 are adapted to control the axial reciprocatory movement of its associated bars 114 and 116. Each of the bars 114 and 116 is provided with a series of four longitudinally spaced angle-shaped or L-shaped member 128, which members are secured to the bars 114 and 116 in any conventional manner. Associated pairs of members 128 of a companion pair of bars 114 and 116 constitute date forming cups 132 which are adapted to receive dates gravitationally discharged from the conveyor 30. Thus each companion pair of bars 114 and 116 are associated so as to define a series of four aligned forming cups 132 which are spaced corresponding to the spacing of the date pockets 54 of the bars 52. The forming cups 132 are adapted to be moved from an opened position to a closed position, both of said positions being illustrated in Fig. 7, under the control of mechanism to be described hereinafter. Thus each of the forming cups 132 is defined by a companion pair of end members 134 and a pair of side members 136, it being noted that a companion pair of side members and end members are disposed in parallel relation. Each of the bars 114 and 116 are guided for longitudinal and lateral movement by means of the pins 142 which are secured to bars 112 and which extend in the inclined slots 144 in bars 114 and 116. It is here to be noted that the companion pairs of bars 114 and 116 are oppositely arranged with the rollers 126 and members 128 of said bars being oppositely arranged whereby companion pairs of members 128 are adapted to define cups 132 and with said bars being adapted to be actuated from opposite ends thereof. It is also to be noted that plates 108 are supported for movement by means of the laterally spaced and longitudinally extending fixed support members 122 which are mounted to frame structure of the apparatus in any desired manner. The bars 114 and 116 are further guided for the above described movement by means of guide members 138 and 140 which are adapted to coact with end portions of said bars. The guide members 138 and 140 are secured to bars 112 in any suitable manner and have transversely extending slots 150 in which end portions of bars 114 and 116 are positioned, said slots being dimensioned so as to provide for the range of lateral movement of said bars. Thus bars 112 support bars 114 and 116 with the cooperation of members 138 and 140, and, more particularly, the slots 150 thereof. Companion pairs of bars 114 and 116 are laterally and longitudinally movable towards each other so that when the forming cups 132 advance a predetermined amount the latter will be closed as indicated at 132' of Fig. 7. Thus each of the forming cups 132 on advancing on conveyor 100 a predetermined amount will be closed from an open position so as to assume the position indicated at 132'. It is to be understood that the forming cups 132 will be in an open condition when they are in date receiving position in relation to the conveyor 30 and that the conveyors 30 and 100 are operated in timed relation so that each series of four cups 54 of bars 52 will be aligned with a companion series with four forming cups 132 defined by a companion pair of bars 114 and 116. Thus each of the cups 54 of bars 52 will register with a companion forming cup 132 whereby it will be apparent that the dates $d$ discharged from cups 54 of conveyor 30 will be received in forming cups 132 of conveyor 100. In order to facilitate and insure this registry of each of the cups 54 with a forming cup 132 there is provided a laterally spaced series of longitudinally extending deflector plates 154 which are disposed between adjacent rows of forming cups 132. Each of the deflector plates 154 disposed between and adjacent pair of forming cups 132 will have oppositely inclined longitudinally extending marginal edge portion 156 and 158, said edge portions being inclined in a direction to deflect any dates striking thereagainst into a forming cup 132. The outside longitudinally extending deflector plates 154' will have a longitudinally extending inclined marginal edge portion 158' which is adapted to deflect any dates striking thereagainst into an adjacent forming cup as will be readily apparent. Thus the deflector plates 154 will extend longitudinally in the region of transfer between the conveyors 30 and 100 and are adapted to facilitate and insure the positive and unfailing transfer of any dates from cups 54 to a registered forming cup 132. It will be noted that the dates are displaced approximately 90 degrees in the transfer to conveyor 100 so that dates on conveyor 100 will have their longitudinal axes extending parallel to the direction of travel of said conveyors, it being noted that said date angular displacement is facilitated by plates 154. More particularly, the plates 154 are laterally spaced closer than the average length of the dates so that the latter will strike the plates and be angularly deflected as described above in their transfer to conveyor 100. Thus the forming cups 132 will be in an opened condition when in date receiving relation with a companion registered cup 54 and the further advance of said forming cups will be effective to close the latter so as to form the dates and position them for further processing. More particularly, the forming cups 132 when in a closed condition as indicated at 132' will form the dates positioned therein corresponding to the shape defined by said forming cups and it will be apparent that the closing of the forming cups in the manner to be described in detail hereinafter will be effective to form, size, and properly position the dates for subsequent processing in the instant apparatus.

In order to provide for the closing of the forming cups 132 on the advance of the forming cups on the conveyor 100 from date receiving position, there is provided a pair of fixed cam runs 160 and 162 which are adapted to actuate associated rollers 126 in fixed relation to the bars 114 and 116. It will be apparent that the cam run 162 is adapted to actuate the cam rollers 126 of bars 114 whereas the cam run 160 is adapted to actuate rollers 126 of bars 116. The start of the straight cam runs as indicated at 164 and 166, of the cam runs 160 and 162, respectively, are laterally spaced corresponding to the lateral spacing of an associated pair of bars 114 and 116 whereby it will be apparent that a companion pair of such bars will be simultaneously actuated so as to simultaneously actuate members 128 and close the forming cups 132 defined by said members. Thus the start 164 and 166 of the straight portions of cam runs 160 and 162, respectively, are longitudinally staggered corresponding to the spacing of a companion pair of bars 114 and 116. The rollers 126 of the bars 114 and 116 will be inwardly moved when said rollers advance into cooperative association with their associated cam runs, said bars being moved to their full in position when said rollers advance to points 164 and 166 of the cam runs 160 and 162, respectively. The inward axial movement of the bars 114 and 116, due to the cooperative association of rollers 126 and cam runs 160 and 162, will be effective to laterally move a companion pair of said bars towards each other due to the cooperative association of pins 142 and companion slots 144. Thus the axial inward movement of each of the bars 114 and 116 in the manner described above will be effective to laterally displace said bars towards each other so as to define the series of aligned closed forming cups as indicated at 132'. The openings or slots 150 will be provided with sufficient clearance to provide for the aforedescribed lateral movement of bars 114 and 116. It will be noted that when bars 114 and 116 are actuated to their full in position the forming cups 132 will be fully closed and consequently the dates positioned therein will be pressed so as to form, size, and position said dates for further processing.

On the further advance of the closed forming cups 132', said forming cups will be opened to its initial opened position 132 by means of the cooperative association of the rollers 126 and the cam runs 168 and 170 which are longitudinally spaced forwardly of the cam runs 160 and 162, aforedescribed. The closed forming cups 132' are opened to position 132 in a similar manner to the closing thereof except that the bars 114 and 116 are now actuated by the cam runs 168 and 170 in an axial opposite direction. The fixed cam runs 168 and 170 are structurally similar to the cam runs 160 and 162 aforedescribed except that the former cam runs are oppositely arranged relative to the latter cam runs. The points 172 and 174 at the start of the inclined portions of the cam runs 168 and 170, respectively, are longitudinally spaced or staggered corresponding to the lateral spacing of a companion pair of bars 114 and 116 whereby it will be apparent that said companion pair of bars will be simultaneously actuated in an axial outward direction in the aforedescribed manner. Thus after a predetermined amount of advance movement of the conveyor 100, the bars 114 and, more particularly, the cam rollers 126 thereof will coact with the cam run 170 so as to move said bars in an axial outward direction, said axially outward movement being effective to effect the lateral movement of said bars to its initial position corresponding to the opened condition of the forming cups 132. Similarly, the rollers 126 of bars 116 will coact with the cam run 168 commencing at point 172 so as to axially move said bars outwardly and laterally outwardly. It will be apparent that the axial or longitudinal outward movement of the bars 114 or 116 by means of the cam runs 170 and 168, respectively, will effect the lateral outward movement thereof through the cooperative association of pins 142 and inclined slots 144 disposed in said bars. It is to be noted that each transversely extending aligned row of dates positioned in forming cups 132 corresponds to the transversely extending aligned row of cups 54 in bars 52 and that said aligned rows of dates in forming cups 132 are adapted to be positioned in receptacle 14 so as to constitute a transversely aligned row r of dates in said receptacle. Thus each transversely aligned row of dates positioned in forming cups 132, defined by a companion pair of bars 114 and 116, is adapted to form a transversely aligned row r of dates d in the package 12.

As aforenoted, the cam runs 160, 162, 168 and 170 are fixed to the apparatus 10 in any desired manner and are spaced relative to said apparatus to provide for the coaction between said cam runs and the cam rollers 126 of the bars 114 and 116. Thus after a predetermined advance movement of the closed forming cups 132', the latter will be opened and will consequently be conditioned for the reception therein of another date from the conveyor 30. As will be subsequently described in detail, after the forming cups are opened to their initial opened position, the dates positioned therein will be removed therefrom by apparatus to be described in detail hereinafter. Accordingly after the forming cups 132' are opened the dates positioned therein will be removed therefrom whereby said cups will be conditioned for the reception therein of another date. The dates positioned in the closed forming cups 132' will be penetrated and picked up by means to be described hereinafter.

*Pick-up station*

Figure 9:
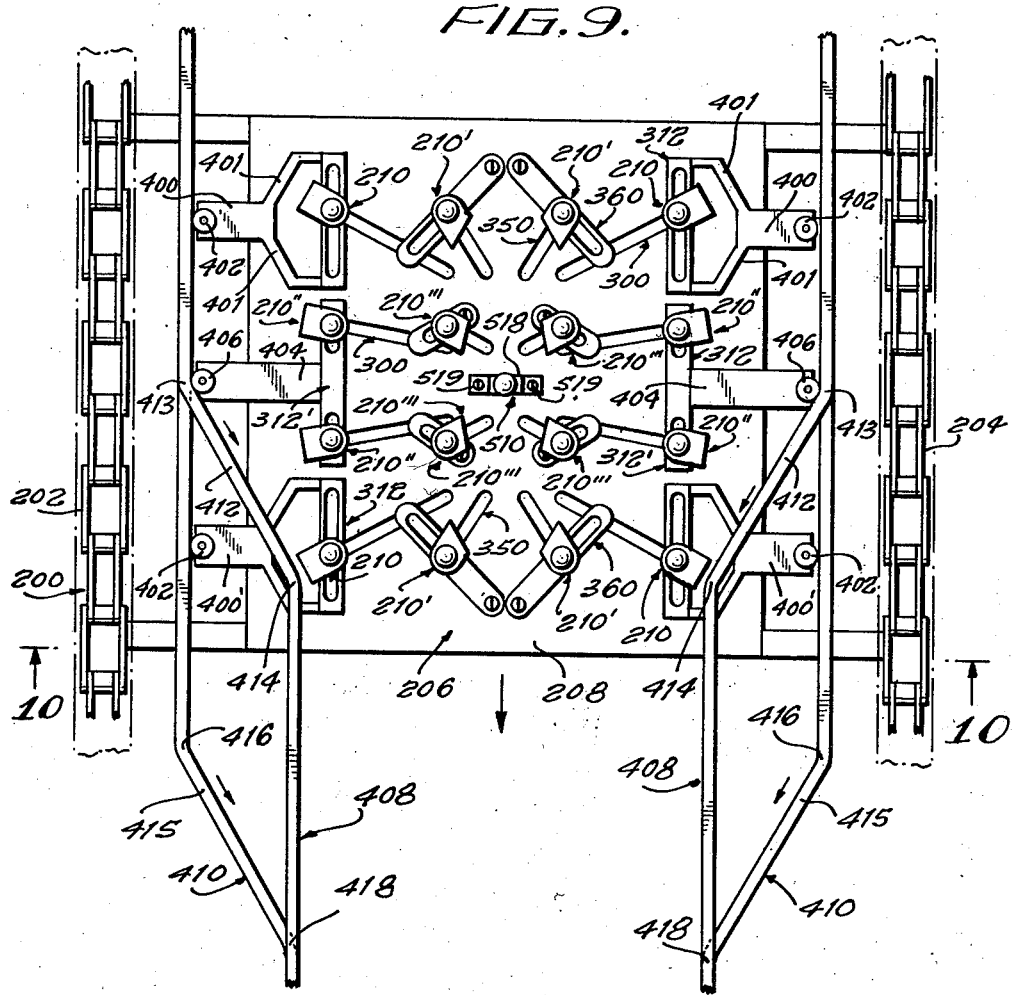
Fig. 9 is a top plan view of the control head and associated mechanism with the pick-up heads being shown in the degrouped position.
Figure 10:
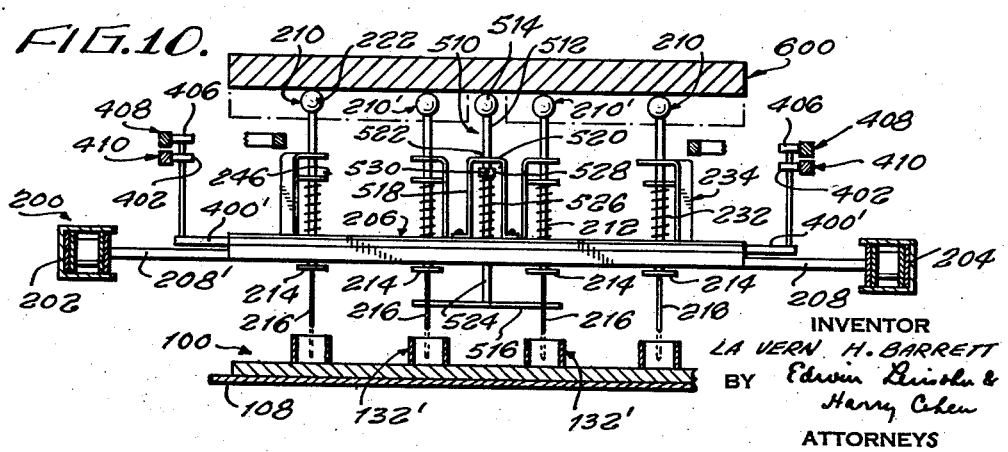
Fig. 10 is a sectional view taken on the line 10—10 of Fig. 9.

With reference to Figs. 9 and 10, there is shown an endless conveyor 200 comprising a pair of laterally spaced link chains 202 and 204 which are structurally similar to the link chains 102 and 104 of the conveyor 100 aforedescribed. Secured to the link chains 202 and 204 and extending therebetween is a series of control heads 206 positioned adjacent to each other and having shafts 208' projecting therefrom which are secured to the link chains 202 and 204 in any suitable manner. Thus the series of control heads 206 are secured to the conveyor 200 and are movable therewith, it being understood that said conveyor will be provided with a series of said control heads extending therearound, one of which is shown in Figs. 9 and 10. Each of the control heads 206 is adapted to control the movement of a series of 16 dates d corresponding to one layer of dates in the package 12. Thus each control head 206 is adapted to pick-up a layer of dates from the conveyor 100 and to deposit said layer, in the predetermined arrangement to be described in detail, in the receptacle 14. It follows from the above therefore that the control head 206 will be provided with a series of four transversely aligned rows and a series of four longitudinally aligned rows of date pick-up means whereby to provide for the controlled movement of a series of dates which ultimately will be deposited in the receptacle portion 14 of package 12 as a single layer thereof.

The control head 206 will now be described in detail. With reference to Figs. 15 and 17 through 20, the control head 206 comprises a base plate 208 having a plurality of pick-up heads 210 associated therewith in a manner to be described in detail hereinafter. Each plate 208 will have associated therewith a group of sixteen pick-up heads 210 which are arranged in series of four transversely and four longitudinally aligned rows, there being sixteen pick-up heads 210 in the illustrated embodiment corresponding to the sixteen date layer to be packed in package 12. Each of the pick-up heads 210 is structurally similar and comprises an axially reciprocable plunger 212 having a plate 214 secured to the bottom thereof, said plate carrying a pair of pick-up needles 216 which are spaced so as to penetrate a date and pick-up the latter. Thus the pick-up needles 216 terminate at the free ends thereof as needle points and said needles are adapted to penetrate and pick-up a date on the axial projection thereof on the axial projection of the plunger 212. It is to be understood that each of the pick-up heads 210 is structurally similar and functions in a similar manner under the control of means to be subsequently described. The upper end 218 of plunger 212 terminates as a cup-shaped portion 220, the latter having positioned therein a ball 222 which is rotatably mounted in the cup portion 220, said ball being adapted to cooperate with overhead cam mechanism to be subsequently described in order to control the reciprocation of the plunger 212. The plate 208 is apertured therethrough as indicated at 224 for the reception of the bearing part 226, the latter being secured in said aperture and being apertured therethrough as indicated at 228 for guiding and forming a bearing for the reciprocation of the plunger 212. The bearing part 226 projects upwardly of plate 208 and is provided with a collar 230 which is adapted to cooperate with a compression spring 232 which surrounds part of the plunger 212. It will be understood that the aperture 228, which extends through the bearing part 226, is dimensioned so as to slidably receive the plunger 212 therein. The plunger 212 is mounted in a substantially U-shaped frame 234, the latter comprising an upstanding part 236 and a pair of laterally spaced projecting parts 238 and 240. The base part 238 of the frame 234 is apertured therethrough as indicated at 242, for the reception therethrough of the bearing part 226. The frame part 240 is apertured therethrough as indicated at 244, said aperture being adapted for the slidable reception of the plunger 212 wherein it will be apparent that the frame part 240 constitutes means for guiding the plunger 212 at the upper part thereof. It will be understood that the apertures 228 and 244 are in vertical alignment whereby to guide the plunger 212 for vertical reciprocation. Adjustably secured to the plunger 212 between the frame parts 238 and 240 is a guide part 246 having a pair of projecting arms 248 which define an opening 250 extending therebetween, said opening being dimensioned complementary to the frame part 236 with the latter guiding the part 246 for vertical reciprocatory movement. Thus the laterally spaced arms 248 straddle the frame part 236 and the latter is adapted to guide the guide part 246 for its range of vertical reciprocation. The guide part 246 is further provided with a bent over portion 251 which defines a substantially U-shaped part 252. The U-shaped part 252 is provided with a pair of spaced and aligned apertures 254 which are adapted for the extension therethrough of the plunger 212, it being understood that the apertures 254 are dimensioned so as to slidably receive said plunger. In order to secure the guide part 246 to the plunger 212 there is provided a clamping screw 256 which is adapted to be clamped against the plunger 212 for retaining the guide part in vertically adjusted position. Clamping screw 256 will also be effective to prevent the rotation of needles 216 from a position of parallel alignment with the direction of travel of conveyor 200. The upper end of the compression spring 232 is adapted to coact with the guide part 246 whereby it will be apparent that spring 232 is effective to spring urge the plunger 212 in a vertically upward direction. It will be apparent that the amount of energy stored in spring 232 may be adjusted by the vertical positioning of the guide part 246 by means of the clamping screw 256. Thus one end of spring 232 coacts with the shoulder 230 whereas the opposite end of said spring coacts with the guide part 246, said spring being adapted to urge the plunger 212 and concomitantly the pick-up needles 216 into its vertically uppermost position which will be limited by the interengagement of plate 214 with the bearing part 226. As noted above each of the pick-up heads 210 is of similar construction and is integrated with the plate 208 in a similar manner, said pick-up heads 210 being spaced corresponding to the spacing of the group of dates to be picked up by the control heads 206 from the forming cups 132.

Each of the pick-up heads 210 is axially reciprocable and laterally movable under the control of means to be described hereinafter. The conveyor 200 which carries the control heads 206 is operated in timed relation with conveyor 100 and the control head 206 is adapted to pick-up a companion group of dates in registry therewith from the forming cups 132 of the conveyor 100. The group of dates to be picked up by the control head 206 is penetrated by the needles 216 with the forming cups in a closed condition, as indicated at 132', whereby it will be apparent that the dates to be picked up by said needles will be restrained against displacement during the picking-up operation. After the group of dates to be picked up are penetrated by the needles 216, forming cups 132' will have advanced to a position in which said forming cups are in an open condition whereby the group of dates may be readily picked up without resistance from the members 128 which constitute such forming cups. Thus the group of dates to be picked up are penetrated with the forming cups in a closed condition and are physically raised with the forming cups in an open condition, it being understood that the mechanism to be subsequently described which reciprocates the plungers 212 is timed in relation to the advancing movement of the conveyor 100. Thus with a group of forming cups in a closed condition and with dates positioned therein, the plungers 212 of the control head 206 are actuated in a manner to be described in detail hereinafter to penetrate said group of dates to be picked up and on the further advance of the conveyor 100 the plungers 212 and more particularly the needles 216 thereof, which are imbedded in the group of dates to be picked up, will return to a position vertically spaced upwardly of the penetrated position whereby to pick-up said group of dates, it being understood that during the picking-up operation the forming cups 132 will have advanced to its initial open position. The mechanism for controlling the vertical reciprocatory movement of the plungers 212 will be described in detail hereinafter and it suffices at this point to state that said plungers are vertically displaced to lowered positions by means of overhead cam mechanism which is adapted for cooperative association with the balls 222 and that said plungers are adapted to be returned to their upper position by means of the compression springs 232. After a group of dates are picked up by a registered group of pick-up heads 210, the latter are adapted to be laterally displaced and grouped corresponding to the layers of package 12. Thus following the pick-up operation aforedescribed the pick-up heads will be laterally displaced to a grouped position corresponding to the grouping of one of the layers 18 and 20 of the receptacle part 14 of the package 12. This grouping operation will now be described.

*Grouping and boxing stations*

Figure 15:
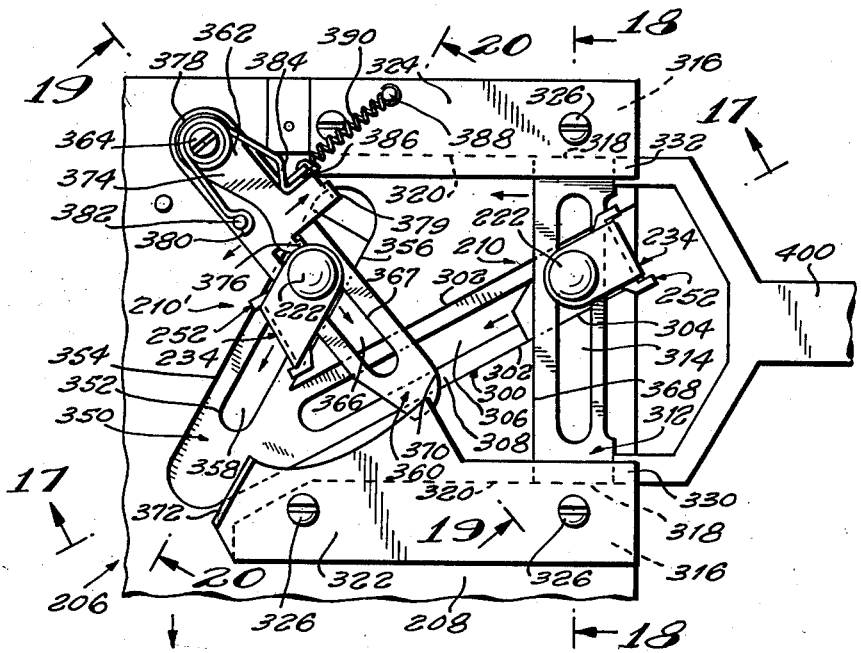
Fig. 15 is a fragmentary top plan view of the control head with the pick-up heads thereof shown in the degrouped position.
Figure 16:
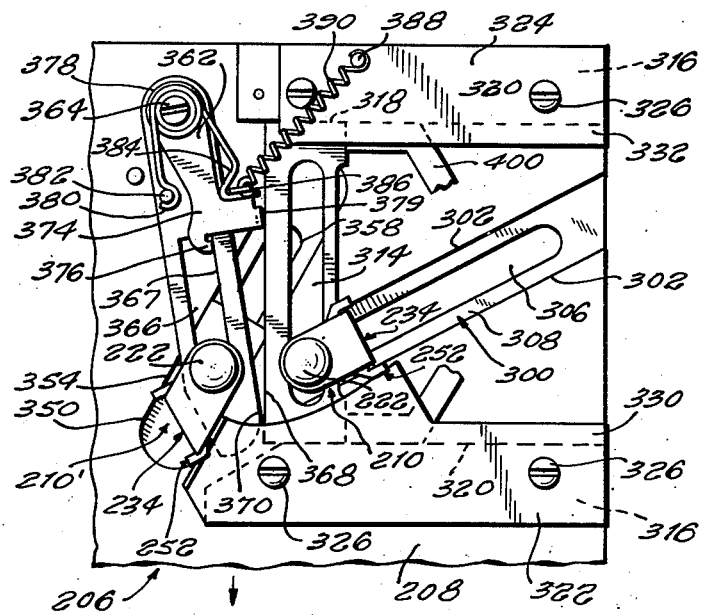
Fig. 16 is a view similar to Fig. 15 showing the pick-up heads in the grouped position.
Figure 21:
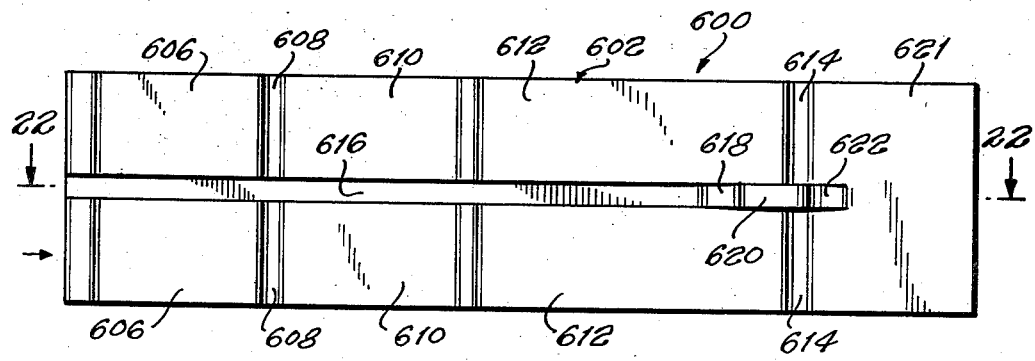
Fig. 21 is a bottom plan view of the overhead cam plate for controlling the axial reciprocation of the pick-up heads and the press plate.
Figure 22:
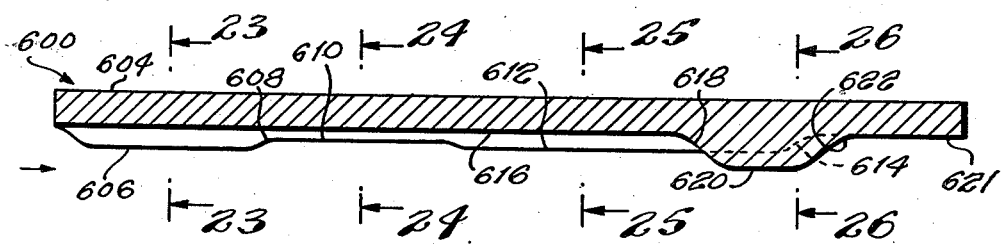
Fig. 22 is a sectional view taken on the line 22—22 of Fig. 21.
Figure 23:
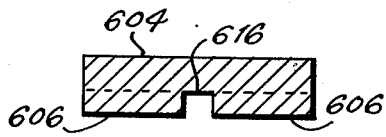
Fig. 23 is a sectional view taken on the line 23—23 of Fig. 22.
Figure 25:
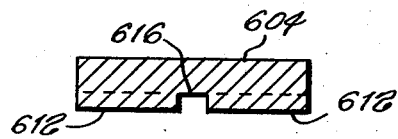
Fig. 25 is a sectional view on the line 25—25 of Fig. 22.
Figure 24:
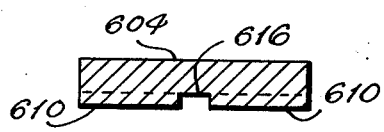
Fig. 24 is a sectional view taken on the line 24—24 of Fig. 22.
Figure 26:
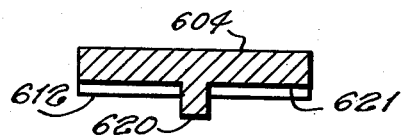
Fig. 26 is a sectional view taken on the line 26—26 of Fig. 22.

Each group of sixteen pick-up heads 210 is adapted to be laterally displaced from the degrouped position shown in Figs. 9 and 10 to the closed or grouped position as shown in Figs. 11 and 12. With reference to Figs. 15–20, the plate 208 is provided with a shallow diagonally extending slot 300 which defines shoulders 302 which are adapted to cooperate with edge portions 304 of the frame part 238, said frame part being guided for movement in said slot 300. The base part 308 of the shallow slot 300 is slotted therethrough as indicated at 306, said slot being dimensioned complementary to the bearing part 226 of the pick-up head 210. Thus the pick-up head 210 is guided for movement along the slot 306, it being noted that the bearing part 226 is adapted to ride in slot 306. Thus with reference to Fig. 15, it will be noted that the pick-up head 210, and more particularly the frame part 234 thereof, is slidably movable along the slot 300 whereby the plunger 212 carrying the pick-up needles 216 is concomitantly movable along said slot in the direction of the arrow in Fig. 15. The pick-up head 210, and more particularly the bearing part 226 thereof, has associated therewith a laterally movable member 312, the latter being provided with a longitudinally extending slot 314 which is dimensioned complementary to the bearing part 226, it being understood that the latter is slideably movable along the slot 314. The member 312 is guided for lateral movement in a direction transverse to the direction of travel of conveyor 200 by means of the members 316 which are affixed to the plate 208 in any desired manner, it being understood that the end edges 318 of member 312 are slideably movable along the longitudinally extending edges 320 of members 316. In order to prevent the vertical displacement of member 312 during its aforedescribed lateral movement there is provided a pair of plates 322 and 324 which are secured to the members 316 and plate 208 in any desired manner, as by means of the screws 326, which are adapted to be received in the tapped holes 328 in plate 208. The plates 322 and 324 will have inner longitudinally extending marginal edge portions 330 and 332, respectively, which overlap end portions of the member 312 so as to prevent the latter from being bodily displaced in a vertical direction. Thus the plates 322 and 324 in association with the plate 208 will define tracks which will guide member 312 for movement laterally of plate 208. The member 312 is movable between an outermost or degrouped position as shown in Fig. 15 to an innermost or grouped position as shown in Fig. 16, it being understood that the movement of the member 312 will be effective to laterally move the frame 234 of pick-up head 210 due to the cooperative association of the bearing part 226 and slot 314 of said member. It will therefore be apparent that the movement of the frame 236 along the slot 300 will be effective at the same time to laterally move the needles 216 carried by plunger 212. The pick-up head 210'' is structurally similar to the pick-up head 210, above described in detail, and is laterally movable relative to the plate 208 in a manner now to be described.

The plate 208 is provided with an angularly extending shallow slot 350 which is structurally similar to the slot 300 aforedescribed and intersects the latter, said slot 350 having a base part 352 and shoulders 354, said shoulders being adapted to cooperate with the edge portions 356 of the frame part 238 of frame 234 of pick-up head 210'. Thus the frame 234 of head 210' is laterally movable along the slot 350 in a manner similar to the movement of the frame 234 of pick-up head 210 along its companion slot 300. It is to be noted that the slots 300 and 350, which are structurally similar, are mutually inclined towards each other whereby the pick-up heads 210 and 210' will tend to converge towards each other in the movement thereof from the degrouped to the grouped position. The base part 352 of slot 350 is slotted therethrough as indicated at 358, said latter slot being adapted to guide the sliding movement of the bearing part 226 during the movement of pick-up head 210' from the degrouped to the grouped position. The movement of the frame 234 of the pick-up head 210' is under the control of the member 360 which has its end 362 pivotally mounted to the plate 208 by means of the pivot pin 364. The bearing part 226 of pick-up head 210' rides in the slot 366 which extends longitudinally of the member 360, it being apparent that the pivotal movement of the member 360 about pivot pin 364 will be effective to move its associated frame 234 along the slot 350. When the member 312 has been laterally moved inwardly of the plate 208 a predetermined amount, the inner edge 368 of said member which constitutes a cam edge will coact with the cam edge 370 of member 360 to pivot the latter about pivot pin 364, said pivotal movement being effective to translate the frame 234 of pick-up head 210' along the slot 350. Thus the movement of member 312 from the degrouped to the grouped position will be effective to correspondingly laterally move the frame 234 of head 210 and after a predetermined amount of movement of said member 312, the latter will coact with member 360 to pivot the latter which will be effective at the same time to move the frame 234 of pick-up head 210' along the slot 350. Accordingly, the movement of the inner pick-up head 210' from the degrouped to the grouped position is under the control of an associated pick-up head 210 and the movement of the latter to the degrouped position will be effective to concomitantly move the pick-up head 210' to said degrouped position. It is to be noted that the plate 322 is provided with an upstanding flange 372 which is adapted to cooperate with and guide an adjacent edge portion of frame part 236 of head 210' during the movement of the latter from the degrouped to the grouped position. The member 360 asscociated with a pick-up head 210' is spring urged into the degrouped position by means of the spring 390 and lever 374. More particularly, lever 374 is mounted for pivotal movement on member 360 by means of the pivot pin 364 and said lever is provided with a depending portion 376 which projects into the slot 366 and coacts with an inner edge portion 367 thereof. Integrated with the pivot pin 364 is a sear spring 378 which has one end 380 cooperatively associated with an upstanding pin 382 fixed to member 360 and has its opposite end 384 cooperatively associated with the upstanding part 386 of lever 374. It will be readily apparent that the sear spring 378 will be effective to bias the lever 374 into engagement with edge 367 of slot 366. Extending between the part 386 of lever 374 and the post 388 fixed to the plate 324 is a tension spring 390 which will be effective to bias lever 374 in a degrouping direction. The biasing of lever 374 in this manner will be effective to bias member 360 and concomitantly pick-up head 210' in a degrouping direction. Thus the effect of the tension spring 390 will be to produce a biasing component of force in a degrouping direction which will be effective to bias the pick-up head 210' in this same direction. The purpose of the aforedescribed biasing force will be apparent from the description which follows. It is to be noted that lever 374 is provided with a downwardly extending part 379 which is adapted to cooperate with the cam edge 368 of member 312 in the manner now to be described. When the member 312 has been moved inwardly of plate 208 a predetermined amount edge 368 of said member, will pivot member 360 about pin 364 as aforedescribed until said edge abuts part 379 of lever 374. At this point part 379 will coact with edge 368 so as to move head 210' in a grouping direction at a faster rate than head 210 is moved in said direction for a brief interval so as to provide the requisite degree of clearance for the movement of the date carried by head 210 to the grouped position, it being understood that spring 378 is sufficiently strong as to provide for such action without part 376 of lever 374 disengaging from edge 367. The further grouping movement of member 312 will pivot part 376 away from edge 367 against the action of spring 378 until head 210 has been moved to the grouped position. In Fig. 16, head 210' is shown in a fully grouped position and head 210 is shown displaced slightly from the fully grouped position, lever 374 being adapted to be pivoted in a clockwise direction so as to permit head 210 to be moved to the fully grouped position, as will be readily apparent.

Each of the companion pairs of pick-up heads 210 and 210' operate in a similar manner as aforedescribed except that the companion pairs of pick-up head 210'' and 210''' positioned intermediate the pick-up heads 210 and 210' of control head 206 will be mounted for angular movement in a different angular direction than the movement of the companion pairs of pick-up heads 210 and 210' aforedescribed. Thus the pick-up heads 210'' and 210''' will be moved from the degrouped to the grouped position in a similar manner to the movement of the pick-up heads 210 and 210' to said position except that the companion pairs of pick-up heads 210'' and 210''' will be moved at different angular directions along the plate 208. It is also be noted that the operation of the control head 206 is symmetrical relative to the axis of travel or the longitudinal axis thereof. Thus the pick-up heads 210 at one side of the longitudinal axis of plate 208 function in an identical manner as the pick-up heads 210 on the opposite side of said axis. Thus the pick-up heads 210 aforedescribed in detail are adapted for movement from a degrouped position as illustrated in Figs. 9 and 10 to a grouped position as illustrated in Figs. 11 and 12 with each of the companion pairs of pick-up heads 210, 210', 210'' and 210''' operating and coacting in a similar manner except for the angle of lateral movement on plate 208.

The control means for grouping the pick-up heads 210 will now be described in detail. Secured to end portions of members 312, by means of connecting links 401, of each of the pick-up heads 210 is a laterally projecting arm 400 which has mounted thereto at the outer end thereof a cam roller 402. It will be apparent that the axial movement of the arms 400 by means to be described will be effective to correspondingly move its associated pick-up head 210 from the degrouped to the grouped position. Each of the inner pairs of pick-up heads 210'' has associated therewith an arm 404 which is axially movable to correspondingly move the companion pick-up heads 210'' in unison from the degrouped to the grouped position. More particularly, the members 312 of a companion pair of pick-up heads 210'' are preferably formed of one-piece as indicated at 312', and the latter has an arm 404 secured thereto and accordingly the axial movement of said arm 404 will be effective to correspondingly move the companion pair of pick-up heads 210″ in unison in a grouping direction. The arm 404 has extending upwardly therefrom a cam roller 406, the latter being adapted to cooperate with associated cam structure for the movement of the pick-up heads in a manner to be described in detail hereinafter. The arms 400 and 400′ and associated structure at the corner portions of the control head 206 are structurally identical and similarly the arms 404 positioned intermediate the arms 400 and 400′ are structurally identical, and, as noted above, the apparatus functions in a symmetrical manner relative to the longitudinal axis of the control head 206. The arms 400, 400′, and 404 are axially movable under the control of the cam runs 408 and 410 which are fixed to the apparatus in any desired manner. The cam runs 408 and 410 are vertically spaced from each other and the arm 404 is adapted for operative association with cam run 408 whereas the arms 400 and 400′ are adapted for cooperative association with the cam run 410.

On the advance of the control head 206 by conveyor 200 the arm 404 will be the first arm to be actuated, this actuation taking place by means of the cooperative association of the cam roller 406 and the inclined portion 412 of the cam run 408. Since the grouping and degrouping operations are symmetrical relative to the longitudinal axis of head 206, the operation of heads 210 at one side of head 206 will be described in detail. Thus arm 404 will be the first arm to be actuated and said actuation will be effected through the cooperative association of cam roller 406 and the inclined portion 412 of the cam run 408. Thus when the roller 406 advances to the point 413 at the start of the incline portion 412 of the cam run 408 said roller and concomitantly the pick-up heads 210″ will be moved in a grouping direction and at point 414 of said cam run the pick-up heads 210″ and 210‴ will be fully grouped. It is essential to actuate arm 404 prior to the actuation of the arms 400 and 400′ in order to provide clearance for the grouping movement of the pick-up heads 210 and 210′. Thus by moving the arm 404 in a grouping direction prior to the movement of the arms 400 and 400′ in said direction clearance is provided for the movement of the pick-up heads 210 and 210′ and the dates carried thereby to the grouped position. Following the grouping of the pick-up heads 210″ and 210‴ in the aforedescribed manner, arm 400′ will be the next arm actuated on the further advance of the control head 206. Thus the cam roller 402 of arm 400′ will coact with the inclined portion 415 of cam run 410 to move its associated pair of pick-up heads 210 and 210′ in a grouping direction. Thus when the roller 402 of arm 400′ reaches point 418 of cam run 410 its associated pick-up heads will be fully grouped. Arm 400, which is the last arm to be actuated, will be actuated in an identical manner with arm 400′ on the further advance of the control head 206 by the conveyor 200. Thus the arm 400 will coact with the cam run 410 in an identical manner as the aforedescribed coaction between arm 400′ and said cam run with arm 400 being reciprocated inwardly subsequent to the grouping of the pick-up heads associated with the arm 400′. Thus arm 404 will be the first arm to be actuated by its associated cam run 408 and arms 400′ and 400 will be actuated sequentially in that order by means of the common cam run 410. From the above it will therefore be apparent that the advance of the control head 206 by means of conveyor 200 will be effective to laterally displace the pick-up heads 210 from the degrouped to the grouped position in the timed sequential manner aforedescribed whereby it will be apparent that the dates carried by the needles 216 of the pickup heads 210 will be grouped corresponding to one of the layers 18 and 20 of package 12. Following the grouping operation as aforedescribed the group of dates carried by the control 206 will be deposited in the receptacle part 14 of the package 12 in the manner now to be described.

With reference to Fig. 1, there is shown an endless conveyor 500 which is of the link chain type aforedescribed, said conveyor being adapted to carry the receptacle parts 14 into position in timed relation with the control head conveyor 200 for deposition in said receptacle parts of a layer of dates, grouped in the aforedescribed manner. Thus the upper run 500′ of the conveyor 500 is inclined and is adapted to carry the receptacle parts 14 of package 12 in timed relation with the movement of the control heads 206, said conveyor being provided with transversely disposed push bars 502 spaced longitudinally of conveyor 500, said push bars being adapted to carry receptacles 14 up upper run 500′ into position in registry with a grouped layer of dates carried by a companion control head 206. Thus each of the receptacles 14 carried by conveyor 500 are adapted to register with a control head 206 carrying dates in a grouped condition and when receptacle 14 is advanced to the position 14′, the grouped dates carried by the control head 206′ will be deposited in said receptacle by mechanism to be described in detail hereinafter. Thus receptacle 14′ and control head 206′ advance into registry and when said registry occurs the grouped pick-up heads 210 will have the plungers 212 thereof axially reciprocated in a downward direction whereby to deposit a layer of dates in said receptacle. Thus when the receptacle 14 advances to position 14′, a grouped layer of dates will be deposited therein, said depositing being effected by the movement of the plungers 212 of pick-up heads 210 in a downward direction under the control of mechanism to be described in detail hereinafter. The depositing of a grouped layer of dates in receptacle 14 is clearly shown in Figs. 12 and 33, it being understood that the instant apparatus is adapted to deposit a single grouped layer of dates at a time in said receptacle. After a grouped layer of dates is deposited in a receptacle 14, said deposited group of dates will be pressed and stripped from the pick-up heads 210 in a manner to be described in detail hereinafter.

*Pressing and degrouping stations*

With reference to Figs. 9, 10, 11 and 12, the pressing head 510 is positioned substantially centrally of the control head 206 and comprises a plunger 512 which is axially moveable between the retracted position shown in Fig. 10 and the extended position shown in Fig. 12. Plunger 512 is structurally similar to the plungers 212 aforedescribed of the pick-up heads 210 and terminates at the upper end thereof in a ball 514 which is adapted to coact with associated overhead cam means in a manner to be described in detail for axially reciprocating plunger 512. The plunger 512, at the lower end thereof, carries a press plate 516 which is of a size and shape to fit into receptacle 14 to press a layer of dates positioned therein. Thus the press plate 516 is receivable in receptacle 14 with a slight amount of clearance and it will be apparent that the axial reciprocation of plunger 512 to its extended position will be effective to press the layer of dates positioned in a receptacle 14 below said press plate. Plunger 512 extends through a complementary aperture in plate 208 and is guided for axial movement by means of the U-frame 518 which is secured to the upper face of plate 208 in any desired manner, as by means of screws 519. The bight portion 520 of the frame 518 is apertured therethrough as indicated at 522 for the reception therethrough of the plunger 512. Surrounding the plunger 512 between the press plate 516 and the bottom face of plate 208 is a tubular part 524 which constitutes stop means for limiting the movement of plunger 512 in a retracting direction. The plunger 512 is biased in a retracting direction by means of the compression spring 526 which surrounds said plunger, one end of said spring coacting with the upper face of plate 208 and the other end of said spring being restrained in position by means of the stop collar 528. The stop collar 528 is adjustable axially of the plunger 512 and is retained in axially adjusted position by means of a suitable clamping screw 530. Thus the biasing force of compression spring 526 may be readily adjusted by adjusting the axial position of the stop collar 530, it being understood that the spring 526 is effective to bias plunger 512 and concomitantly press plate 516 in a retracting direction.

With reference to Fig. 13, it will be noted that the press plate 516 is of rectangular configuration complementary to the configuration of the receptacle part 14 and said plate is provided with a plurality of angularly disposed slots 532, said slots being adapted for the reception of the pick-up needles 216 when the latter are moved to the grouped position in the manner aforedescribed. Thus the pick-up needles 216 of the pick-up heads 210 are adapted to enter slots 532' when said pick-up heads are moved to a grouped position and similarly the pick-up heads 210', and more particularly the needles 216 thereof, are adapted to enter the slots 532" when said pick-up heads are actuated to the grouped position. Thus the press plate 516 is provided with a plurality of such angularly disposed slots 532 in order to provide the requisite degree of clearance for the movement of all the pick-up heads 210 from the degrouped to the grouped position. It will further be noted that the pick-up needles 216 of pick-up heads 210''' will extend through the press plate 516 at all times and will be movable along slots 532''' thereof for movement of said needles from the degrouped to the grouped position. From the above it will therefore be apparent that the press plate 516 is provided with a plurality of slots 532 so as to provide the requisite degree of clearance for the movement of the pick-up heads 210 from the degrouped to the grouped position.

After a group of sixteen longitudinally and laterally aligned dates are deposited in an associated receptacle 14, the press plate 516 will be actuated to a retracted position by overhead cam means to be subsequently described, it being understood that said actuation of the press plate will be effective to press the deposited group of dates into said receptacle so that said grouped layer of dates will be flattened to a degree. With the press plate 516 in said extended or pressing position, the pick-up heads 210 will be retracted from a penetrating position in the deposited group of dates and said retraction of said pick-up heads will be effective to strip said deposited group of dates from the pick-up needles 216. Thus with the press plate 516 in its extended position in receptacle 14, the pick-up heads will be retracted from the deposited layer of dates in a manner to be described in detail hereinafter, it being apparent that said retraction of the pick-up heads 210 will be effective to strip the dates from the needles 216 since the press plate 516 will prevent the movement of the deposited layer of dates outwardly of the receptacle 14. From the above it will therefore be apparent that press plate 516 is effective to press a grouped layer of dates in the receptacle 14 and at the same time said press plate will coact with the pick-up needles 216 to affect the aforedescribed stripping action. After the deposited group of dates have been stripped from their associated pick-up needles 216, the press plate 516 will return to its initial or retracted position by means to be subsequently described and following such retraction of the press plate 516, the pick-up heads 210 will be actuated to their degrouped position for the commencement of another pick-up cycle as aforedescribed. The degrouping operation of the pick-up heads 210 following the aforedescribed pressing and stripping operations will now be described in detail.

The arms 400', 400 and 404 are adapted to be actuated sequentially in that order and the cam run 550 is adapted to cooperate with arms 400' and 400 whereas the cam run 552 is adapted to cooperate with arm 404 for effecting the degrouping of their associated pick-up heads 210. It will be understood that the arms 400' and 400 are first actuated to effect the degrouping of their associated pick-up heads in order to provide clearance for degrouping the pick-up heads associated with the arm 404. When cam roller 402 of arm 400' reaches point 554 of cam run 550 the degrouping actuation of said arm will commence and when said cam roller reaches point 556 of said cam run said degrouping operation will be completed. Thus when the arm 400' is advanced to the position 556 of cam run 550 the pick-up heads 210 associated with said arm will be fully degrouped to their initial position. Similarly, when the arm 400, and more particularly when the cam roller 402 thereof, reaches point 554 the degrouping of the pick-up heads associated with said arm will commence and said pick-up heads will be in a fully degrouped position when the cam roller 402 of arm 400 reaches the point 556 of the cam run 550. Following the degrouping of the pick-up heads associated with the arms 400' and 400, the intermediate arm 404 will advance to the point 558 of the cam run 552 and at said point the degrouping actuation of the pick-up heads associated with arm 404 will commence. When the cam roller 406 of arm 404 advances to the position 560 of the cam run 552 the degrouping operation of the pick-up heads associated with arm 404 will be completed and from the above it will be apparent that when arm 404 advances to said position 560, the control head 206 will be in a fully degrouped condition. The pick-up heads 210 and 210'' will thus be positively degrouped by the cam arrangement aforedescribed whereas the pick-up heads 210' and 210'' will be degrouped by springs 390 when companion pickup heads are degrouped in said positive manner. It will also be apparent from the above that the degrouping cam operation aforedescribed is substantially the reverse of the grouping operation aforedescribed and that the cam runs 550 and 552, which affect the degrouping action of the control head 206, are structurally similar to the cam runs 408 and 410 aforedescribed which effect the grouping operation of said control head. From the above it will therefore be apparent that when the cam roller 406 of arm 404 advances to the position 560 of its associated cam run 552 the control head 206 will be in a fully degrouped position and will be in a condition to commence another cycle of operation in the manner aforedescribed. The cam runs 550 and 552 are fixed to the apparatus in stationary relation therewith in any desired manner and said cam runs are vertically spaced corresponding to the vertical spacing of the arms 400 and 404.

After each successive control head 206 is degrouped in the aforedescribed manner, said control heads will be advanced on conveyor 200 and during the advance of said control heads to the area of pick-up, said control heads will be thoroughly cleaned and dried. With reference to Fig. 1, the control heads 206, on the advancing of conveyor 200, will be subjected to a series of water sparys 562 from the spray tubes 564. As shown in Fig. 1, there are two such spray tubes 564 provided and the water sprays, 562 eminating therefrom are preferably in the form of a fine mist. After the control heads 206 are subjected to said water sprays they are thoroughly cleaned by a, preferably revolving, brush 566. On the further advance of the control heads 206 the water spray will be repeated by means of the spray tubes 568, and thereafter the control heads 206 will be thoroughly brushed by means of the revolving brush 570. On the further advance of the control heads 206 so sprayed and brushed, said control heads will be thoroughly dried by means of the blower 572 which has its discharge outlet directed towards the upper face of said control heads. Thus when the degrouped control heads 206 reach the pick-up area for the commencement of another cycle of operation, said control heads will be in a thoroughly cleaned and dried condition. The apparatus 10 is preferably provided with a sheet metal, or the like, protective hood 574 which is positioned above the upper run of the conveyor 200 and substantially encases the cleaning means aforedescribed. Positioned below the upper run 200' of the conveyor 200, in fluid receiving relation therewith, is a water pan 576 which is adapted to receive the cleaning fluid and other matter discharged from said conveyor, said water pan being provided with outlet pipes 577 which may communicate with any suitable drain means as will be readily apparent. Positioned above the upper run 500' of the conveyor 500, in spaced relation therewith, is a pan 578 which is adapted to receive water and other matter discharged thereon from the mechanism spaced thereabove whereby it will be apparent that said water pan will be effective to prevent the discharge of any foreign matter in the receptacles 14 carried by said conveyor. Positioned below the lower run of the conveyor 100 are a series of spray tubes 580 which are adapted to spray said conveyor for cleaning purposes in the manner aforedescribed. Similarly in an advanced position relative to conveyor 100 from the spray tubes 580 is a revolving brush 582 which is adapted to thoroughly clean the previously sprayed conveyor 100. It is to be understood that the apparatus 10 may be provided with any desired cleaning and drying apparatus and that the cleaning and drying apparatus and the positioning thereof relative to the apparatus 10 is given by way of example only. Thus the apparatus 10 may be provided with other cleaning and drying devices, either in lieu of, or in addition to, the cleaning devices aforedescribed. The overhead cam mechanism 600 for actuating the pick-up heads 210 in the aforedescribed manner will now be described in detail.

Over-head cam mechanism

With reference to Figs. 21 to 26 and 33, the overhead cam mechanism 600 comprises a longitudinally extending cam plate 602 having a substantially flat upper face 604 and lower cam faces which will be described in detail hereinafter. The cam mechanism 600 is adapted to axially reciprocate the pick-up heads 210 and the press plate head 510 and more particularly, said cam mechanism is adapted to cooperate with the balls 222 and 514 of the pick-up heads and press plate head, respectively. The cam plate 602 is provided with a cam face portion 606 at one end thereof which is adapted to actuate the pick-up heads 210 into the pick-up position aforedescribed. Thus when the balls 222 of the advancing pick-up heads 210 advance to the cam face portion 606, said balls will be depressed or axially reciprocated downwardly whereby the pick-up needles 216 associated therewith will penetrate dates in registry therewith. It will therefore be apparent that as the pick-up heads 210 advance to cooperate with the cam face 606, said pick-up heads will be axially reciprocated downwardly and will penetrate dates positioned therebelow in registry therewith. When the pick-up heads 210 advance to the position 608 of cam face 606 the springs 232 associated with said pick-up heads will be effective to raise or return the needles 216 a predetermined amount, said needles being raised sufficiently to clear the forming cups 132 in which the dates are positioned when the pick-up heads 210 cooperate with the cam face 606. Thus when the pick-up heads 210 coact with the cam face 610, the pick-up needles 216 of said pick-up heads will be in a sufficiently raised position so as to clear the forming cups 132 which at this point of advance will be in an open condition. When the pick-up heads 210 advance to the cam face 612, said pick-up heads will be reciprocated axially downwardly so as to position the needles 216 thereof carrying dates as to engage a companion receptacle 14 in which the dates will be deposited. Thus when the pick-up heads 210 advance so as to be operatively associated with the cam face 612, said pick-up heads will be slightly lowered from their position when cooperatively associated with the cam face 610. Accordingly, when the pick-up heads 210 are cooperatively associated with the cam face 612, the needles 216 thereof will be in a lowered position so as to engage a receptacle 14 which is advancing on its associated conveyor in timed relation with the advance of said pick-up heads. It will be apparent that after the pick-up heads 210 are lowered by means of the cam face 612, said pick-up heads will be grouped so that the layer of dates carried thereby may be deposited in a registered receptacle 14. When the pick-up heads 210 advance to the position 614, which constitutes the end of cam face 612, said pick-up heads will be raised, it being understood that the springs 232 associated with said pick-up heads will be effective to return said pick-up heads to their initial raised position. Thus at point 614, at the terminus of cam run 612, the pick-up heads 210 will be axially reciprocated to their raised position whereby to complete the cycle of operation performed by the overhead cam mechanism 600. Following the raising of the pick-up heads 210 to their initial position in the aforedescribed manner, said pick-up heads will be degrouped by the degrouping means, aforedescribed in detail, whereby it will be apparent that said pick-up heads will be conditioned to repeat the aforedescribed cycle of operation.

The lower face of the overhead cam plate 602 has defined therein a substantially centrally disposed longitudinally extending slot 616 which is adapted for cooperative association with the ball 514 of plunger 512. The ball 514 is adapted to ride in the slot 616 and when said ball advances to the position 618, said ball will be axially reciprocated so as to extend or actuate the press plate 516 associated therewith in a vertically downward direction. Thus when ball 514 of the press plate head 510 advances so as to cooperate with the cam face 620, the press plate 516 will be in a fully extended position in which said press plate is adapted to press a layer of dates positioned in the receptacle 14. Thus the ball 514 will ride in the slot 616 for a predetermined length of advancement and when said ball 514 is advanced sufficiently to cooperate with the cam face 620, said ball will be depressed so as to extend the press plate 516 into a registered receptacle 14 in which a grouped layer of dates has been deposited. When the press plate head 510 has advanced to the position 622, said head will be permitted to raise or retract to its initial position, it being understood that said retraction will be effected by means of the spring 526 associated with said press plate head. Accordingly when the ball 514 of the press plate head 510 has advanced to the position 622, said press plate head will have completed a cycle of operation and will be conditioned to repeat the cycle of operation aforedescribed. The press plate 516 will be returned to its retracted position after the retraction of the needles 216 of the pick-up heads 210 from the deposited layer of dates. From the above it will therefore be apparent that the cam 620 is adapted for cooperative association with the press plate head 510 only and is so positioned as to clear the pick-up heads 210 during the advance thereof through this station. It will therefore be evident from the above that the cam 620 constitutes a press plate actuating cam and is adapted for cooperative association with the ball 514 of the press plate head 510 of each of the control heads 206. It will be understood that the press plate 516 is adapted to press a single grouped layer of dates at a time and accordingly in the instant embodiment there is provided one such press plate for each group of 16 pick-up heads which corresponds to the number of dates in a layer of the instant embodiment. After a grouped layer of dates has been deposited in a receptacle 14 and after said layer of dates has been pressed in the aforedescribed manner, said receptacle 14 will be advanced on conveyor 500 to the next station in which a divider sheet 22 will be positioned in said receptacle in superposed relation with the bottom layer 18 of dates. The divider sheet and package cover feed stations will now be described in detail.

*Divider sheet and package cover feed stations*

The divider sheets 22, which are formed of a fibrous material, are substantially coextensive with the date layers and are of the size and shape as to be receivable in receptacles 14 with a slight amount of clearance. The divider sheet feed mechanism 800 comprises a frame 802 having a rotor 804 operating therein, said rotor carrying four arms 806 spaced 90 degrees apart. It will be apparent that the rotor 804 may be provided with any number of arms 806 and the latter are adapted to transfer divider sheets 22 from the feed tube 808 to the upper run 500′ of the conveyor 500. Each of the arms 806 is mounted on a hollow shaft 810 and said arms are slideably mounted on said shafts for a purpose which will be evident from the description which follows. The outer end of each arm 806 is provided with a pick-up plate 812, which pick-up plate is substantially coextensive with the divider sheets 22 to be transferred by the mechanism 800. The rotor 804 is rotatably mounted on shaft 814 and said rotor is driven by any suitable means (not shown). The arms 806 and shafts 810 are hollow and are in fluid communication with each other and with the interior 816 of the rotor 804. The arms 806 are adapted to be axially reciprocated at predetermined intervals by means of the cam rollers 818 which are suitably affixed to arms 806 and are adapted for operative association with the cams 820 and 822. The cam rollers 818 are adapted to ride in the cam track 824 and when said rollers are operatively associated with the cam 820 of said cam track, the arms 806 will be axially projected into operative association with the feed tube 808. After a roller 818 is so operatively associated with the feed tube 808, the arm 806 carrying said roller will be retracted to its initial position and will be conditioned for rotary advance to a position for depositing the divider sheet 22 picked up at the feed tube 808. The cams 822 of the cam track 624 are structurally similar to the cams 820 aforedescribed and cams 822 are adapted for cooperative association with rollers 818 for projecting arms 806 outwardly so as to deposit a picked-up divider sheet 22 into the receptacle 14 in superposed relation with the bottom layer of dates positioned therein. Thus the cams 820 are adapted to control the axial projection and retraction of an arm 806 when the latter is operatively associated with the feed tube 808 and similarly the cams 822 are adapted to cooperate with the rollers 818 to control the axial projection and retraction of said arms when the latter are operatively associated with the receptacle 14 in which the picked-up divider sheet 22 is to be deposited.

The feed tube 808, a fragmentary portion of which is shown in Fig. 27, is substantially of arcuate contour and is cross-sectionally complementary to the divider sheets 22 to be fed towards the outlet end 826 thereof. The uppermost divider sheet 22′ in the tube 808 will have a suitable weight 828 positioned thereon in order to urge the stack of divider sheets 22 in said feed tube towards the outlet end 826 thereof. The hollow tubes 806 are adapted for cyclical communication with a suitable source of negative pressure (not shown) which will be applied to the interior of said arms in timed relation with the rotation of the rotor 804. Thus when each arm 806 is rotatably advanced for operative association with the feed tube 808, said arm interiorly thereof will be subjected to a source of negative pressure, which source of pressure will be effective to cause the lowermost divider sheet 22 to adhere to the plate 812. The plate 812 will be suitably apertured as indicated at 813, and the latter will be in fluid communication with the interior of the arm 806 so that when a source of negative pressure is applied to the interior of said arm, said source of negative pressure will be in fluid communication with apertures 813 of said plate. Thus as each arm 806 is advanced to a position of registry with the feed tube 808 a source of negative pressure will be in fluid communication with the plate 812 and said source of negative pressure will be applied against the adjacent face of the lowermost divider sheet 22 so as to cause the latter to adhere to said plate for transferral to the receptacle 14. When the plate 812, having a divider sheet 22 adhering thereto by means of the negative pressure aforedescribed, reaches a position of registry with a receptacle 14, said source of negative pressure will be automatically cut off by any suitable means so that said divider sheet will gravitate in superposed relation with the layer 18 of dates in the receptacle 14. It will be understood that the rotor 804 will be operated in timed relation with the conveyor 500 so that an arm 806 carrying a divider sheet 22 will register with a receptacle 14 in which said divider sheet is to be deposited. Each of the arms 806 is structurally similar and functions in a similar manner to effect the transferral of the divider sheets 22 from the feed tube 808 to a receptacle 14 which is advancing on the conveyor 500 by means of the transverse pusher bars 502. It is to be understood that one divider sheet 22 is positioned on the layer 18 and that the package 12 which has two superposed layers of dates positioned wherein will have but one divider sheet 22 which will act as a separator between the layers. It is to be noted that each of the plates 812 are apertured as indicated at 813 and said apertures in turn are in fluid communication with the interior of the arms 806 and mounting shafts 810 whereby when a source of negative pressure is applied to the interior or said arms and shafts, said source of pressure will be effective to pressure urge a divider sheet 22 onto the face of the pick-up plate 812. After a divider sheet 22 is positioned in superposed relation with the bottom layer 18 of dates in receptacle 14, a second layer of dates will be positioned on said divider sheet in a manner to be described hereinafter and after the receptacle 14 is filled with two layers 18 and 20 of dates a cover 16 is assembled to the receptacle 14. The manner of assembly of the package covers 16 to the receptacles 14 will now be described with reference to Fig. 28.

After the second layer of dates 20 has been deposited in receptacle 14 the latter will be advanced by the conveyor 850, and more particularly by the push bars 852 thereof, to a position in operative association with the cover feed tube 860. The feed tube 860 is of generally arcuate configuration and is dimensioned cross sectionally so as to accommodate a stacked series of covers 16 positioned therein. The covers 16 will be disposed in the feed tube 860 with their open sides 17 positioned lowermost for a purpose which is obvious. The lower end 862 of the feed tube 860 is provided with a pivotally mounted stop or lever 864 which is adapted to facilitate the discharge of the covers 16 from the tube 860 one at a time. Thus the pivotally mounted stop 864 extends transversely into the feed tube 860 and is adapted to support one end of the covers 16 in the manner shown in Fig. 28. The stop 864 is pivotally movable in a counter clockwise direction from its position shown in Fig. 28, and said stop is limited in clockwise rotation by the interengagement thereof with part 865 of tube 860. The lowermost cover 16′ in the feed tube 860 is conditioned for cooperative association with the receptacle 14 and as said receptacle advances on conveyor 850 it will interengage with said lowermost cover 16′ and more particularly with the forward end thereof. Thus as the receptacle 14 is advanced by the conveyor 850, the forward wall 23 of said receptacle will engage the forward wall 21 of cover 16′ and advance the latter along conveyor 850 and carry the same out of the feed tube 860. It will be apparent that only one cover 16′ will be conditioned for association with a receptacle 14 at a time and when the lowermost cover 16' is discharged from the tube 860, the next lowermost cover 16" will gravitationally descend and occupy a lowermost position. The forward end part 872 of cover 16" will rest on the upper face part 874 of the lowermost cover 16' and when the latter cover is carried from the tube 860 by the receptacle 14, the cover 16" will descend to occupy the position of the lowermost cover 16'. After the receptacle and cover assembly are advanced by the conveyor 850 from the tube 860, the roller 880, which may be power driven in any suitable manner, will be effective to firmly engage cover 16 on receptacle 14. Thus the roller 880 is spaced from the conveyor 850 corresponding to the depth of package 12 whereby it will be apparent that when the receptacle and cover assembly advances through roller 880, said cover will be positioned in firm engagement over the receptacle part 14 to complete package 12. Thus after the package 12 is processed by the roller 880 aforedescribed the packaging operation by apparatus 10 will be completed and if desired the completed packages may be conveyed to a station for packing in suitable cartons. Thus the final operation in assembling the package 12 is the subjecting of the assembled receptacle and cover parts to the action of roller 880. The driving mechanism for apparatus 10 will now be described in detail.

*Drive mechanism*

Figure 2:
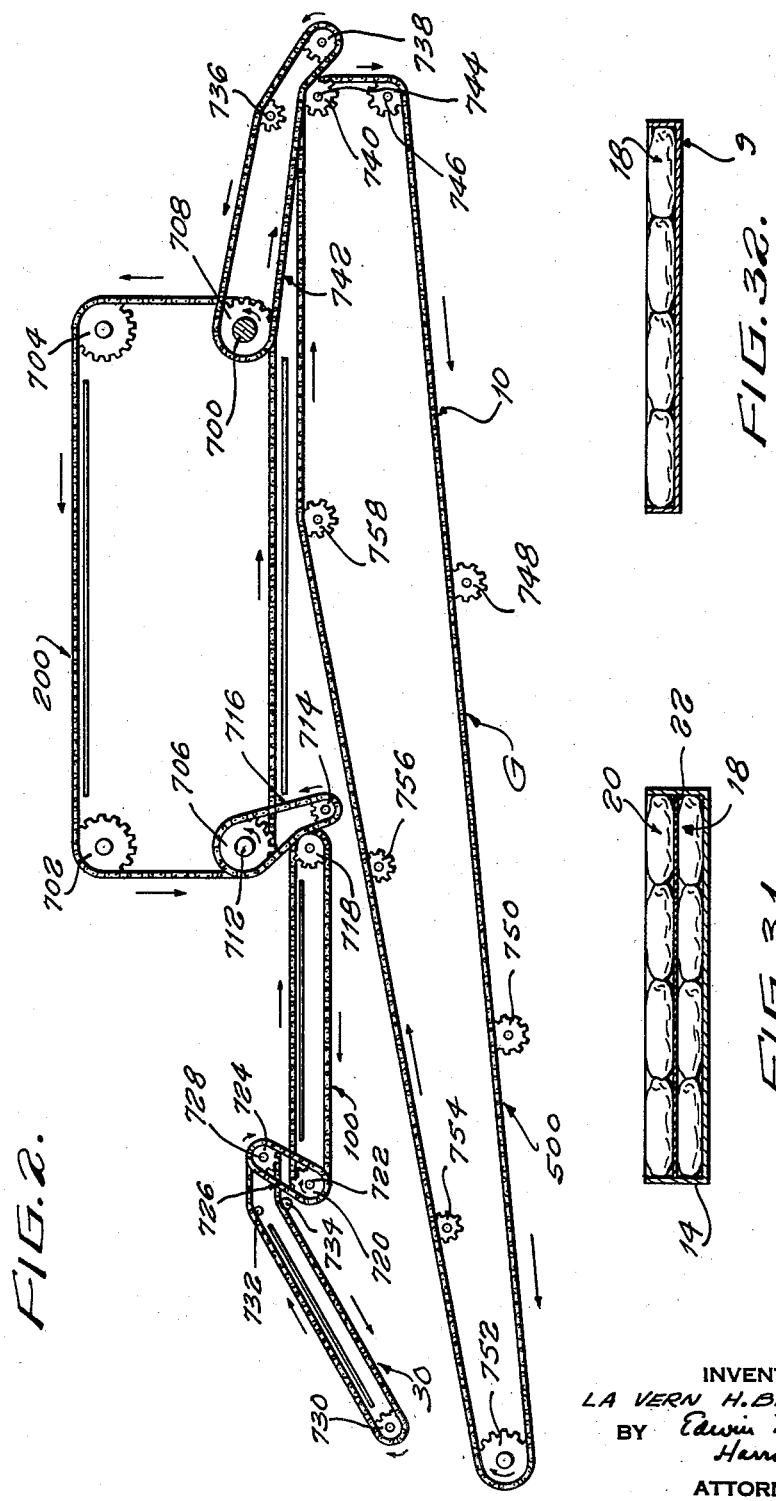
Fig. 2 is a side elevational view of the drive system for the article packaging apparatus.
Figure 3:
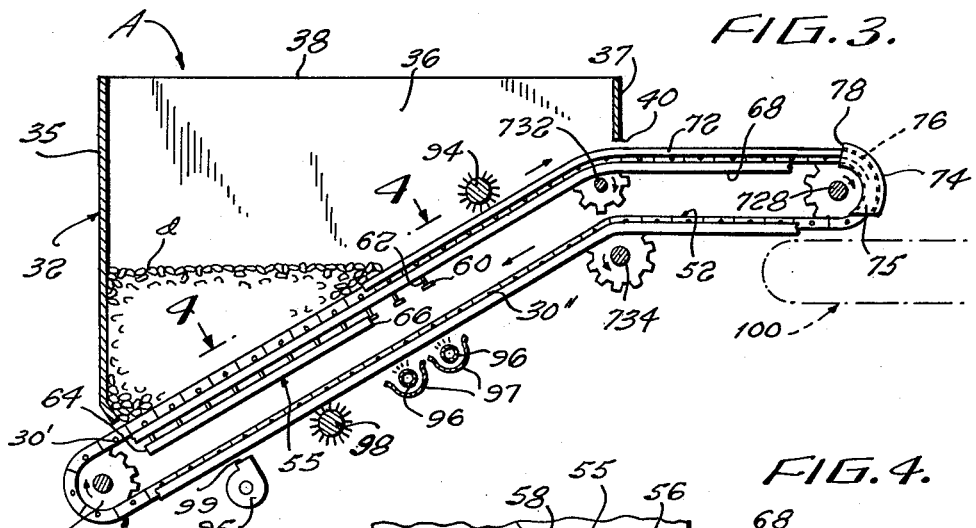
Fig. 3 is a side elevational view of the article feeding apparatus with parts shown broken away to reveal structural details.

The apparatus 10 is preferably driven from a single motor (not shown) which motor is preferably of the variable speed type so as to provide for varying the speed of the package assembling operations aforedescribed. With reference to Fig. 2, the drive shaft 700 is coupled to the motor drive and said shaft constitutes the main drive shaft of the instant apparatus. The control head conveyor 200, which is movable in the direction indicated by the arrows, is carried by a series of four sprockets which are positioned at the corners of said conveyors, said sprockets being 702, 704 and a pair of sprockets which are laterally spaced from the sprockets 706 and 708 and in vertical alignment with sprockets 702 and 704. Thus it will be understood that conveyor 200 is carried by an upper pair of sprockets 702 and 704 and a lower pair of sprockets which are similar to sprockets 702 and 704 and in alignment therewith. Accordingly it will be seen that the rotation of the drive shaft 700 in the direction of the arrow indicated will be effective to advance the conveyor 200 in a corresponding direction, as indicated by the arrows. The sprocket 706 will be driven by the shaft 712 which in turn is driven by the conveyor 200, the sprockets 706 and 714 carrying a link chain 716 which is adapted to drive the conveyor 100. Thus the sprocket 718 will be driven by the link chain 716 and said sprocket will be effective to drive the conveyor 100 in the direction of the arrows indicated. It is to be noted that the conveyor 100 is carried by sprocket 718 and another sprocket longitudinally spaced therefrom which is laterally aligned and spaced from the sprocket 720. Thus laterally spaced and aligned with sprocket 720, will be another sprocket which is adapted for association with the sprocket 718 for carrying the conveyor 100. The conveyor 100 will in turn drive the shaft 722 on which sprocket 720 is mounted whereby it will be apparent that the travel of conveyor 100 will be effective to concomitantly rotate the sprocket 720 in the direction of the arrows. The sprockets 720 and 724 carry a link chain 726 which is adapted to transmit motion from the sprocket 720 to the sprocket 724, the latter thereby driving the shaft 728. Connected to the shaft 728 in laterally spaced relation with the sprocket 724 is a sprocket which is adapted to drive the conveyor 30. Conveyor 30 is carried by sprockets 730, 732, 734, and the drive sprocket carried by the shaft 728 and, as noted above, said drive sprocket will be laterally spaced from and in alignment with sprocket 724.

The sprockets 708, 736, 738 and 740 carry the link chain 742 which in turn is adapted to drive the conveyor 500. Thus the sprocket 708 which is driven from the main drive shaft 700 is adapted to transmit its motion to the conveyor 500 through the intermediation of the link chain 742. In laterally spaced relation with the sprocket 740 is a drive sprocket which is driven by the drive shaft 744, said drive sprocket being adapted to drive the conveyor 500. Thus sprocket 740 which is driven from the link chain drive 742 drives the shaft 744 and the latter has secured thereto a drive sprocket which is adapted to drive the conveyor 500 in the direction of the arrows. The conveyor 500 is carried by sprockets 746, 748, 750, 752, 754, 756, 758, and the drive sprocket which is driven from the shaft 744, and as noted above said drive sprocket is laterally spaced and aligned with the sprocket 740 driven from the link chain 742. Thus sprocket 740 is driven by the link chain 742 and said sprocket drives the shaft 744 which in turn carries the drive sprocket for the conveyor 500. It will therefore be seen from the above that the main drive shaft 700, which will be driven from any suitable motor drive, is effective on the rotation thereof to drive the main conveyors of the apparatus in the direction of the arrows indicated, and in timed relation, to effect the coordinated operation aforedescribed. It is to be understood that the drive system aforedescribed is given by way of example only and that other drive systems may be utilized to effect the timed operation aforedescribed of the apparatus 10. Furthermore, the various conveyors of the instant apparatus may be supported in any desired manner and the specific embodiment illustrated is given by way of example only. A summary of the operation of the instant apparatus will now be given.

*Summary of operation*

Dates d to be packaged by the instant apparatus are initially loosely or promiscuously fed to hopper 32 and the dates in said hopper will be deposited in cups 54 of conveyor 30, said deposition being effected by the joggling or reverse reciprocating movement of the bars 52 carrying the cups 54. Thus each of the cups 54 of the conveyor 30 will have a single date positioned therein and a transverse row of four cups 54 corresponds to a transverse row r of a layer of dates 18 and 20 in the package 12. After the dates d in the cups 54 are sufficiently advanced, said dates will be transferred to a Forming and Positioning Station in which said dates will be received in forming cups 132, it being understood that said forming cups will be in an open condition when the dates are transferred thereto from the conveyor 30. Thus one date will be transferred to each open forming cup 132 from a companion cup 54 and the forming cups on the further advance of conveyor 100 will be closed so as to form, size, and properly position the dates positioned therein for further processing. On the further advance of the dates d in the closed forming cups 132', said dates will be penetrated by the pick-up needles 216 of the pick-up heads 210, and on the further advance of conveyor 100 the forming cups 132' will be open and the dates in said opened cups will be picked up by the pick-up heads 210. Thus the needles 216 of the pick-up heads will penetrate the dates in the forming cups when the latter are in a closed condition and further said pick-up heads will be raised so as to raise the dates carried thereby with the forming cups in an open condition.

Figure 33:
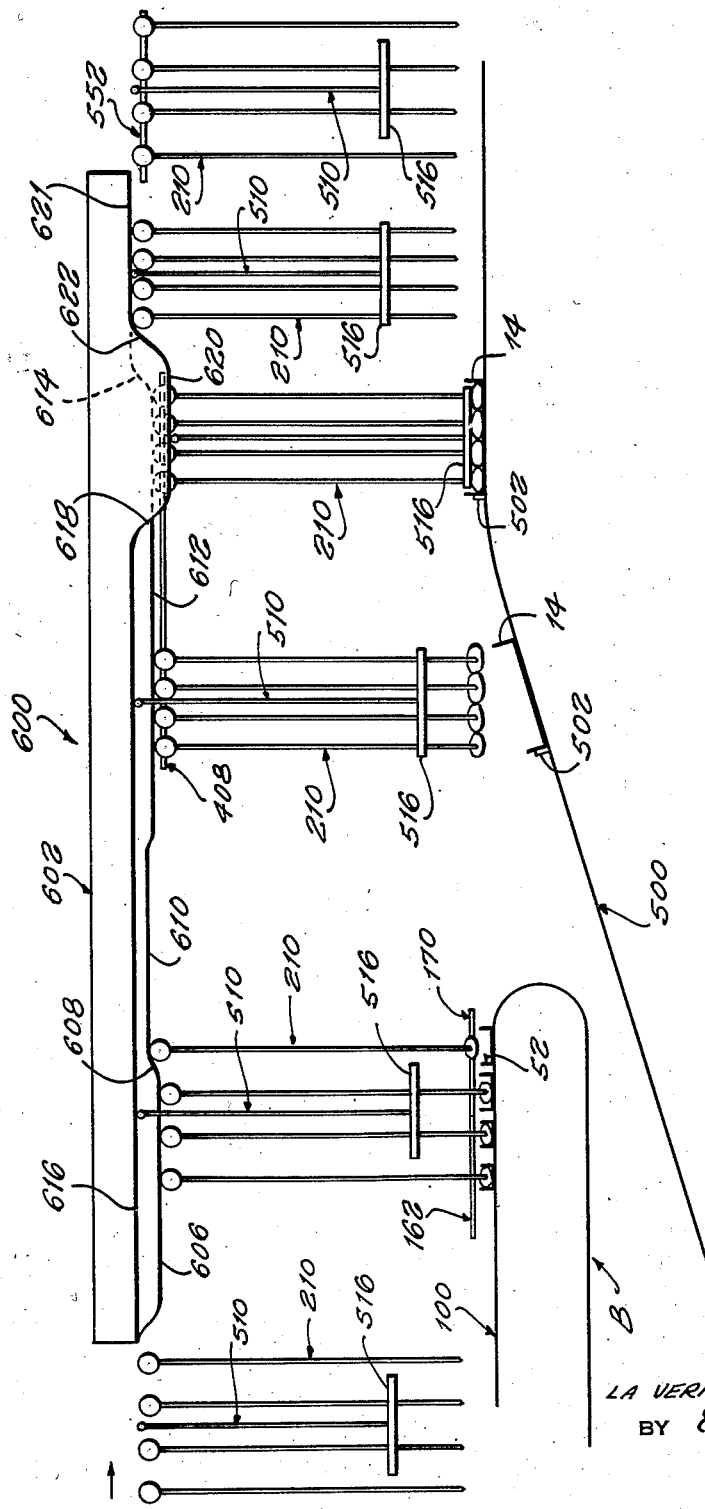
Fig. 33 is a diagrammatic view showing the travel of a control head through a plurality of stations.

With reference to Fig. 33 there is diagrammatically shown a group of 16 dates corresponding to one layer being conveyed through a series of stations of the instant apparatus, it being understood that each control head 206 comprises four transversely aligned rows of pick-up heads 210, whereby each group of four pick-up heads shown in said figure represent a group of 16 pick-up heads corresponding to one control head and one layer of dates to be packaged. Thus in Fig. 33 each single pick-up head 210 shown is representative of a transversely aligned row of four pick-up heads. Immediately prior to the cooperative association of the pick-up heads 210 and the press plate head 510 with the overhead cam mechanism 600, said pick-up heads are in the degrouped position and said press plate head is in the retracted position. On the advance of the pick-up heads 210 into cooperative association with the cam face portion 606, said pick-up heads will be downwardly moved in an axial direction so as to penetrate registered dates positioned in companion forming cups. When the pick-up heads 210 advance into cooperative association with the cam portion 610, said heads will be raised sufficiently so as to permit the dates carried thereby to clear the forming cups. When the pick-up heads 210 advance further into cooperative association with the cam portion 612, said pick-up heads will be axially moved downwardly so as to condition the dates carried by said pick-up heads for deposition into the receptacle 14 which is advancing in timed relation with the advance of said pick-up heads. After the pick-up heads 210 are cooperatively associated with the cam portion 612, said pick-up heads will be grouped by means of the grouping cams aforedescribed whereby the pick-up heads 210 when advanced into operative association with the cam portion 612 will be conditioned for depositing the dates carried by said pick-up heads into the receptacle 14. Thus the pick-up heads 210 and the receptacles 14 will be advanced in timed relation and said pick-up heads will deposit the dates carried thereby into the receptacle 14. After the layer of dates which are grouped in the aforedescribed manner are deposited in the receptacle 14, the cam 620 will be effective to project the press plate 516 into the receptacle 14 so as to press the deposited layer of dates in the aforedescribed manner. With the press plate so projected, the pick-up heads 210 will be axially moved in an upward direction to their initial position and said movement will be effective to strip the grouped layer of dates from the pick-up heads. Following this stripping action of the press plate 516, said press plate will be retracted in the aforedescribed manner. Thus at cam face 621 of the overhead cam mechanism 600, the pick-up heads 210 will be in their uppermost position and in a grouped condition, it being noted that the press plate is now in its vertically uppermost position. After the pick-up heads 210 are disengaged from operative association with the overhead cam mechanism 600, the degrouping cams aforedescribed will be effective to degroup the pick-up heads 210 and to return the latter to their initial position whereby said pick-up heads may be advanced to commence another cycle of operation.

After a layer of dates, and more particularly, after the bottom layer 18 of dates is deposited in receptacle 14, a divider sheet 22 will be placed thereon and thereafter a second layer of dates 20 will be deposited on said divider sheet in the manner aforedescribed. More particularly, the receptacle 14 having a single layer 18 of dates positioned therein with a superposed divider sheet 22, will be conveyed to another station and a second layer of dates 20 will be superposed on said divider sheet in the same manner as the layer of dates 18 was positioned in the receptacle 14. Thus the apparatus for depositing the layer of dates 20 in superposed relation with the divider sheet 22 is identical with the apparatus for depositing the layer of dates 18 in receptacle 14 except that the conveyors 200 and 500 will be vertically spaced from each other so as to compensate for the layer 18 which has previously been deposited in the receptacle 14. If desired conveyors 200 and 500 may be adjustably mounted relative to each other so as to provide for the adjustability of their vertical spacing. Thus the apparatus for depositing the layer of dates 20 in receptacle 14 is identical with the apparatus aforedescribed except that the apparatus for depositing layer 20 will have the conveyors 200 and 500 vertically spaced from each other to compensate for the depth of layer 18 which has been previously deposited in the receptacle 14. It will be understood that the instant apparatus may be utilized to deposit any number of layers in a receptacle and further, if desired, said apparatus may be utilized to deposit but a single layer 18 of dates in a receptacle 9 which is of a size and shape as to accommodate said single layer of dates. Thus as shown in Fig. 32, the receptacle 9 may be dimensioned so as to accommodate a single layer of dates and it will be understood that after such single layer of dates is deposited in said receptacle a cover will be positioned thereon in the aforedescribed manner. Thus the instant apparatus may be utilized to deposit one or more layers of dates in a receptacle and further it will be understood that said apparatus may be utilized to deposit articles other than dates in a prearranged manner.

Thus while the instant embodiment has been illustrated and described for the packaging of dates it will be readily apparent that said apparatus may be utilized to package other articles and further said articles may be arranged in arrangements other than the specific arrangement aforedescribed. Furthermore while the instant embodiment discloses the packaging of a layer 18 of dates comprising four laterally and longitudinally aligned rows, it will be understood that said apparatus may be utilized to package layers of dates or other articles arranged otherwise than as specifically aforedescribed. Thus the instant apparatus readily lends itself to the packaging of articles other than dates and said articles may be packaged in any predetermined arrangement. It will be apparent from the above that the apparatus 10 is adapted to automatically package articles by a series of successive steps commencing with the feeding of the articles to be packaged at a feeding station herein constituted by the feed hopper 32. The instant automatic packaging apparatus substantially reduces the packaging time and expense of the presently, and heretofore used, hand packaging operations whereby articles packaged by the instant apparatus are relatively economical. Packaging, as aforedescribed, is performed quickly consistent with efficiency and a uniform packaged product that is untouched by human hands.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. Apparatus for packaging articles in a receptacle, means for positioning articles from a promiscuous mass thereof in a predetermined arrangement, means for forming and sizing said positioned articles, grouping means for said articles movable from a degrouped position corresponding to said predetermined arrangement to a grouped position corresponding to the size and shape of said receptacle, said grouping means being movable to said grouped position in a plane substantially parallel to the plane of said receptacle, means for transferring said formed and sized articles to said grouping means, means for moving said grouping means to said grouped position whereby to group said transferred articles with the latter being collectively disposed substantially parallel to said receptacle, and means for depositing said grouped articles in said receptacle, said grouping means having pick-up means adapted for operative association with said formed and sized articles for transferring the latter to said grouping means.

2. In apparatus for packaging articles in a receptacle, means for positioning articles from a promiscuous mass thereof in a predetermined arrangement, means for forming and sizing said positioned articles, grouping means for said articles movable from a degrouped position corresponding to said predetermined arrangement to a grouped position corresponding to the size and shape of said receptacle, means for transferring said formed and sized articles to said grouping means, means for moving said grouping means to said grouped position whereby to group said transferred articles, means for pressing said deposited grouped articles, and means for positioning a divider sheet in superposed relation with said pressed grouped articles.

3. In apparatus for packaging articles in a receptacle, means for positioning the complete articles from a promiscuous mass thereof in a predetermined arrangement, means for forming and sizing said positioned complete articles with the latter being retained in a complete condition, grouping means for said articles movable from a degrouped position corresponding to said predetermined arrangement to a grouped position corresponding to the size and shape of said receptacle, pick-up means associated with said grouping means for transferring said formed and sized articles to said grouping means, means for moving said grouping means to said grouped position whereby to correspondingly move said pick-up means and the articles carried thereby to said position, and means for depositing said grouped articles in said receptacle, said pick-up means comprising impaling means adapted to penetrate said formed and sized articles for transferring the latter to said grouping means.

4. In apparatus for packaging articles in a receptacle, means for positioning articles from a promiscuous mass thereof in a predetermined arrangement, means for forming and sizing said positioned articles, grouping means for said articles movable from a degrouped position corresponding to said predetermined arrangement to a grouped position corresponding to the size and shape of said receptacle, pick-up means associated with said grouping means for transferring said formed and sized articles to said grouping means, means for moving said grouping means to said grouped position whereby to correspondingly move said pick-up means and the articles carried thereby to said position, and means for depositing said grouped articles in said receptacle, said pick-up means comprising impaling means adapted to penetrate said formed and sized articles for transferring the latter to said grouping means, and means for stripping said articles from said impaling means following the deposition thereof in said receptacle.

5. In apparatus for packaging articles in a receptacle, a hopper adapted to contain a promiscuous mass of articles, said hopper having an open bottom, means associated with said open bottom for positioning articles from said mass in a predetermined arrangement, said means having receptacles approximating the size and shape of said articles, said receptacles being adapted for longitudinal and lateral movement relative to said hopper when said receptacles are in registry with said open bottom whereby to facilitate the depositing of said articles in said receptacles, said means having receptacles comprising a conveyor, means for longitudinally advancing said conveyor relative to said hopper, and means for moving said receptacles laterally of said conveyor during the advance thereof when said receptacles are in registry with said hopper open bottom.

6. In apparatus for packaging articles in a receptacle, a hopper adapted to contain a promiscuous mass of articles, said hopper having an open bottom, a conveyor operatively associated with said open bottom for positioning articles from said mass in a predetermined spacing and alignment arrangement, means for advancing said conveyor relative to said hopper, said conveyor having a plurality of receptacles approximating the size and shape of said articles, and cam means for laterally reciprocating said receptacles when the latter are in registry with said open bottom whereby to facilitate the depositing of said articles in said receptacles.

7. In apparatus for packaging articles in a receptacle, means for forming and positioning said articles in a predetermined arrangement, said means comprising a single conveyor carrying a plurality of receptacles approximating the size and shape of said articles disposed in a preselected arrangement, each of said receptacles comprising parts movable longitudinally and laterally towards and away from each other for closing and opening said receptacles, respectively, and means for moving said parts longitudinally and laterally towards and away from each other, the movement of said parts towards each other being effective to form and position articles deposited in said receptacles corresponding to said predetermined arrangement.

8. In apparatus for packaging articles in a receptacle, a hopper adapted to contain a promiscuous mass of articles, said hopper having an open bottom, conveyor means operatively associated with said open bottom for positioning articles from said mass in a predetermined arrangement, said conveyor means having receptacles approximating the size and shape of said articles, said receptacles being adapted for reciprocation on the registry thereof with said open bottom whereby to facilitate the depositing of said articles in said receptacles, and second conveyor means operative in timed relation with said conveyor means, said second conveyor means carrying a plurality of receptacles, the latter being disposed so as to register with said first mentioned receptacles for the transfer of articles disposed in the latter to said receptacles of said second conveyor means, said last mentioned receptacles being adapted to form and position articles disposed therein in a predetermined arrangement.

9. In apparatus for packaging articles in a receptacle, a hopper adapted to contain a promiscuous mass of articles, said hopper having an open bottom, conveyor means operatively associated with said open bottom for positioning articles from said mass in a predetermined arrangement, said conveyor means having receptacles approximating the size and shape of said articles, said receptacles being adapted for reciprocation on the registry thereof with said open bottom whereby to facilitate the depositing of said articles in said receptacles, and second conveyor means operative in timed relation wtih said conveyor means, said second conveyor means carrying a plurality of receptacles, the latter being disposed corresponding to said first mentioned receptacles but angularly displaced therefrom, means for transferring said articles from said first mentioned receptacles to said other receptacles, the latter having means for forming and positioning articles disposed therein in a predetermined arrangement.

10. In apparatus for packaging articles in a receptacle, a conveyor, pick-up means carried by said conveyor for longitudinal movement therewith for said articles, said pick-up means being laterally movable from a degrouped position corresponding to a predetermined article arrangement to a grouped position corresponding to the size and shape of said receptacle, and grouping means longitudinally movable with said conveyor carrying said pick-up means for laterally moving the latter to said degrouped and grouped positions along a lineal path whereby to correspondingly move the articles associated with said pick-up means, said pick-up means being axially movable whereby to deposit grouped articles in said receptacle.

11. In apparatus for packaging articles in a receptacle, means for positioning articles from a promiscuous mass thereof in a predetermined arrangement on a first conveyor, a second conveyor movable in timed relation with said first conveyor, said second conveyor carrying a plurality of pick-up devices laterally movable from a degrouped position corresponding to said predetermined arrangement to a grouped position corresponding to the size and shape of said receptacle, grouping means longitudinally movable with said second conveyor carrying said pick-up devices for laterally moving the latter to said degrouped and grouped positions for correspondingly moving the articles carried thereby, a third conveyor for advancing receptacles in timed relation with the movement of said second conveyor, and means for axially moving said pick-up devices for picking up articles in said predetermined arrangement from said first conveyor and for depositing the same in a grouped position in a receptacle in registry therewith carried by said third conveyor.

12. In apparatus for packaging dates in a receptacle, means for positioning said dates from a promiscuously arranged mass thereof in laterally and longitudinally aligned rows on a first conveyor with the longitudinal axis of said dates extending parallel to the direction of travel of said first conveyor, a second conveyor movable in timed relation with said first conveyor, said second conveyor carrying a plurality of pick-up devices laterally movable from a degrouped position corresponding to the arrangement of dates on said first conveyor to a grouped position corresponding to the size and shape of said receptacle, grouping means carrying said pick-up devices for laterally moving the latter to said degrouped and grouped positions for correspondingly moving the dates carried thereby, the dates in said grouped position being disposed in laterally and longitudinally aligned rows in closely spaced relation, a third conveyor for advancing receptacles in timed relation with the movement of said second conveyor, and means for axially moving said pick-up devices for picking up dates from said first conveyor and for depositing the same in a grouped position in a receptacle in registry therewith carried by said third conveyor.

13. In apparatus for packaging dates in a receptacle, means for positioning said dates from a promiscuously arranged mass thereof in laterally and longitudinally aligned rows on a first conveyor with the longitudinal axis of said dates extending parallel to the direction of travel of said first conveyor, a second conveyor movable in timed relation with said first conveyor, said second conveyor carrying a plurality of pick-up devices laterally movable from a degrouped position corresponding to the arrangement of dates on said first conveyor to a grouped position corresponding to the size and shape of said receptacle, grouping means carrying said pick-up devices for laterally moving the latter to said degrouped and grouped positions for correspondingly moving the dates carried thereby, the dates in said grouped position being disposed in laterally and longitudinally aligned rows in closely spaced relation, a third conveyor for advancing receptacles in timed relation with the movement of said second conveyor, and means for axially moving said pick-up devices for picking up dates from said first conveyor and for depositing the same in a grouped position in a receptacle in registry therewith carried by said third conveyor, and means for timing the axial movement of said pick-up devices corresponding to the movements of said first, second, and third conveyors.

14. In apparatus for packaging dates in a receptacle, means for positioning said dates from promiscuously arranged mass thereof in laterally and longitudinally aligned rows on a first conveyor with the longitudinal axis of said dates extending parallel to the direction of travel of said first conveyor, a second conveyor movable in timed relation with said first conveyor, said second conveyor carrying a plurality of pick-up devices laterally movable from a degrouped position corresponding to the arrangement of dates on said first conveyor to a grouped position corresponding to the size and shape of said receptacle, grouping means carrying said pick-up devices for laterally moving the latter to said degrouped and grouped positions for correspondingly moving the dates carried thereby, the dates in said grouped position being disposed in laterally and longitudinally aligned rows in closely spaced relation, a third conveyor for advancing receptacles in timed relation with the movement of said second conveyor, and means for axially moving said pick-up devices for picking up dates from said first conveyor and for depositing the same in a grouped position in a receptacle in registry therewith carried by said third conveyor, and means for pressing said dates deposited in a receptacle, said pressing means being operatively associated with said pick-up devices for stripping the dates therefrom after depositing in a receptacle.

15. In apparatus for packaging dates in a receptacle, means for positioning said dates from a promiscuously arranged mass thereof in laterally and longitudinally aligned rows on a first conveyor with the longitudinal axis of said dates extending parallel to the direction of travel of said first conveyor, a second conveyor movable in timed relation with said first conveyor, said second conveyor carrying a plurality of pick-up devices laterally movable from a degrouped position corresponding to the arrangement of dates on said first conveyor to a grouped position corresponding to the size and shape of said receptacle, grouping means carrying said pick-up devices for laterally moving the latter to said degrouped and grouped positions for correspondingly moving the dates carried thereby, the dates in said grouped position being disposed in laterally and longitudinally aligned rows in closely spaced relation, a third conveyor for advancing receptacles in timed relation with the movement of said second conveyor, said pick-up devices comprising a pair of spaced needles adapted to penetrate the dates on said first conveyor for the transferral thereof to a receptacle, means for axially moving said pick-up devices in timed relation with the movement of said first and third conveyors for picking up dates from said first conveyor and for depositing the same in a grouped position in a receptacle in registry therewith carried by said third conveyor.

16. In apparatus for packaging dates in a receptacle, means for positioning said dates from a promiscuously arranged mass thereof in laterally and longitudinally aligned rows on a first conveyor with the longitudinal axis of said dates extending parallel to the direction of travel of said first conveyor, a second conveyor movable in timed relation with said first conveyor, said second conveyor carrying a plurality of pick-up devices laterally movable from a degrouped position corresponding to the arrangement of dates on said first conveyor to a grouped position corresponding to the size and shape of said receptacle, grouping means carrying said pick-up devices for laterally moving the latter to said degrouped and grouped positions for correspondingly moving the dates carried thereby, the dates in said grouped position being disposed in laterally and longitudinally aligned rows in closely spaced relation, a third conveyor for advancing receptacles in timed relation with the movement of said second conveyor, said pick-up devices comprising a pair of spaced needles adapted to penetrate the dates on said first conveyor for the transferral thereof to a receptacle, means for axially moving said pick-up devices in timed relation with the movement of said first and third conveyors for picking up dates from said first conveyor and for depositing the same in a grouped position in a receptacle in registry therewith carried by said third conveyor, and means for pressing said dates deposited in a receptacle, said pressing means being operatively associated with said pick-up needles for stripping the dates therefrom after depositing in a receptacle.

17. In article packaging apparatus, a plurality of pick-up devices arranged in longitudinally and laterally aligned rows, impaling means carried by said pick-up devices, means for laterally moving said pick-up devices from a degrouped position in which said impaling means are spaced apart in longitudinally and laterally aligned rows and in parallel disposition to a grouped position in which said impaling means are spaced longitudinally and laterally inwardly of said degrouped position in parallel disposition, and means providing for the axial reciprocation of said impaling means when the latter are in said grouped and degrouped positions.

18. In article packaging apparatus, a plurality of pick-up devices arranged in longitudinally and laterally aligned rows, impaling means carried by said pick-up devices, means for laterally moving said pick-up devices from a degrouped position in which said impaling means are spaced apart in longitudinally and laterally aligned rows and in parallel disposition to a grouped position in which said impaling means are spaced longitudinally and laterally inwardly of said degrouped position in parallel disposition, and an axially movable press plate operatively associated with said impaling means and adapted to strip articles therefrom.

19. The method of packaging dates in a receptacle, comprising the steps of positioning dates from a promiscuously arranged mass in laterally and longitudinally aligned rows with the axes of said dates being parallel, impaling said dates, grouping said impaled dates corresponding to the size and shape of said receptacle with said dates being arranged in laterally and longitudinally aligned rows and disposed with their axes in parallel disposition, moving said grouped dates into registry with said receptacle, depositing said grouped dates in said receptacle, and thereafter releasing said deposited dates from impalement.

20. The method of depositing a layer of dates in a receptacle for the packaging thereof, comprising the steps of positioning the number of dates corresponding to said layer from a promiscuously arranged mass in laterally and longitudinally aligned rows with the axes of said dates being parallel, impaling said dates, grouping said impaled dates corresponding to the size and shape of said receptacle with said dates being arranged in laterally and longitudinally aligned rows and disposed with their axes in parallel disposition, moving said grouped dates into registry with said receptacle, depositing said grouped dates in said receptacle, and thereafter releasing said deposited dates from impalement.

21. In apparatus for packaging articles in a receptacle, means for positioning the articles from a promiscuous mass thereof in a predetermined arrangement, means for grouping said articles corresponding to the size and shape of said receptacle, and means for transferring said positioned articles to said grouping means whereby said articles may be grouped for depositing in said receptacle for the packaging thereof, said transfer means comprising impaling means adapted to penetrate said positioned articles for transferring the latter to said grouping means, and means for stripping said articles from said impaling means following the deposition thereof in said receptacle.

22. The method of packaging articles in a receptacle, comprising the steps of pressure forming and sizing articles of non-uniform dimensions, positioning said formed and sized articles in a predetermined longitudinally and laterally spaced apart arrangement, grouping said formed and sized articles corresponding to the size and shape of said receptacle, and thereafter depositing said grouped articles in said receptacle.

23. The method of depositing a plurality of layers of dates in a receptacle for the packaging thereof, comprising the steps of positioning the number of dates corresponding to a layer from a promiscuously arranged mass in laterally and longitudinally aligned rows with the axes of said dates being parallel, impaling said dates, grouping said impaled dates corresponding to the size and shape of said receptacle with said dates being arranged in laterally and longitudinally aligned rows and disposed with their axes in parallel disposition, moving said grouped dates into registry with said receptacle, depositing said grouped dates in said receptacle, releasing said deposited dates from impalement, positioning a divider sheet in superposed relation with said deposited layer of grouped dates, and thereafter depositing a second layer of grouped dates in said receptacle in superposed relation with said divider sheet.

24. In apparatus for packaging articles in a receptacle, means operable on the surface of the articles to be packaged for substantially uniformly shaping and sizing said articles and for positioning the latter in a predetermined arrangement preparatory to the packaging thereof, grouping means for said articles movable from a degrouped position corresponding to said predetermined arrangement to a grouped position corresponding to the size and shape of said receptacle, pick-up means operatively associated with said grouping means for transferring said shaped and sized articles to said grouping means, means for moving said grouping means to said grouped position whereby to correspondingly move said pick-up means and the articles carried thereby to said position, means for depositing said grouped articles in said receptacle, and means for stripping said articles from said pick-up means following the deposition thereof in said receptacle.

25. In apparatus for packaging articles in a receptacle, means operable on the surface of the articles to be packaged for substantially uniformly shaping and sizing said articles and for positioning the latter in a predetermined arrangement preparatory to the packaging thereof, grouping means for said articles movable from a degrouped position corresponding to said predetermined arrangement to a grouped position corresponding to the size and shape of said receptacle, means carried by said grouping means for transferring said shaped and sized articles to said grouping means, means for moving said grouping means to said grouped position whereby to move said transferring means and the articles carried thereby to said position, and means for depositing said grouped articles in said receptacle and releasing the same subsequent to said depositing from said transferring means.

26. In apparatus for packaging articles in a receptacle, means operable on the surface of the articles to be packaged for substantially uniformly shaping and sizing said articles and for positioning the latter in a predetermined arrangement preparatory to the packaging thereof on a first conveyor, a second conveyor movable in timed relation with said first conveyor, said second conveyor carrying a plurality of pick-up devices laterally movable from a degrouped position corresponding to said predetermined arrangement to a grouped position corresponding to the size and shape of said receptacle, grouping means longitudinally movable with said second conveyor carrying said pick-up devices for laterally moving the latter to said degrouped and grouped positions for correspondingly moving the articles carried thereby, a third conveyor for advancing receptacles in timed relation with the movement of said second conveyor, and means for axially moving said pick-up devices for picking up articles in said predetermined arrangement from said first conveyor and for depositing the same in a grouped position in a receptacle in registry therewith carried by said third conveyor.

27. In apparatus for packaging articles in a receptacle, means operable on the surface of the articles to be packaged for substantially uniformly shaping and sizing said articles and for positioning the latter in a predetermined arrangement preparatory to the packaging thereof on a first conveyor, a second conveyor movable in timed relation with said first conveyor, said second conveyor carrying a plurality of pick-up devices laterally movable from a degrouped position corresponding to said predetermined arrangement to a grouped position corresponding to the size and shape of said receptacle, grouping means longitudinally movable with said second conveyor carrying said pick-up devices for laterally moving the latter to said degrouped and grouped positions for correspondingly moving the articles carried thereby, a third conveyor for advancing receptacles in timed relation with the movement of said second conveyor, and means for axially moving said pick-up devices for picking up articles in said predetermined arrangement from said first conveyor and for depositing the same in a grouped position in a receptacle in registry therewith carried by said third conveyor, said pick-up devices comprising impaling means adapted to penetrate said articles on said first conveyor for the transferral thereof to said receptacle.

References Cited in the file of this patent

UNITED STATES PATENTS

| | | |
|---|---|---|
| 324,169 | Rollin | Aug. 11, 1885 |
| 410,553 | Lang | Sept. 3, 1889 |
| 877,773 | Holm | Jan. 28, 1908 |
| 942,527 | Vandiver | Dec. 7, 1909 |
| 1,116,408 | Gaebel | Nov. 10, 1914 |
| 1,348,081 | Brach | July 27, 1920 |
| 1,418,003 | Ladd | May 30, 1922 |
| 1,601,868 | Luce | Oct. 5, 1926 |
| 1,608,163 | Bronander | Nov. 23, 1926 |
| 1,843,229 | Hist | Feb. 2, 1932 |
| 2,254,097 | Wood | Aug. 26, 1941 |
| 2,254,595 | Carroll | Sept. 2, 1941 |
| 2,297,253 | Scottie | Sept. 29, 1942 |
| 2,326,146 | Kurzubin | Aug. 10, 1943 |
| 2,335,613 | Sayen | Nov. 30, 1943 |
| 2,339,115 | Scherer | Jan. 11, 1944 |
| 2,462,276 | Mueller | Feb. 22, 1949 |
| 2,544,125 | Bain et al. | Mar. 6, 1951 |
| 2,559,819 | Hettinger | July 10, 1951 |
| 2,574,771 | Zimmermann et al. | Nov. 13, 1951 |
| 2,583,700 | Lyon | Jan. 29, 1952 |
| 2,635,798 | Thompson | Apr. 21, 1953 |
| 2,693,901 | Olson et al. | Nov. 9, 1954 |

FOREIGN PATENTS

| | | |
|---|---|---|
| 653,046 | France | Oct. 30, 1928 |